United States Patent
Lange et al.

(10) Patent No.: US 12,372,304 B2
(45) Date of Patent: Jul. 29, 2025

(54) RACKING SYSTEM FOR USE IN CONTINUOUS SINTERING FURNACES

(71) Applicant: DSB TECHNOLOGIES, LLC, Janesville, WI (US)

(72) Inventors: Joseph Lange, Janesville, WI (US); Peter DePoutiloff, Janesville, WI (US); Ronald Martin, Janesville, WI (US); Paul Attoe, Janesville, WI (US); Eldon Fuller, Avilla, IN (US)

(73) Assignee: DSB TECHNOLOGIES, LLC, Janesville, WI (US)

( * ) Notice: Subject to any disclaimer, the term of this patent is extended or adjusted under 35 U.S.C. 154(b) by 473 days.

(21) Appl. No.: 17/694,947

(22) Filed: Mar. 15, 2022

(65) Prior Publication Data

US 2022/0299268 A1    Sep. 22, 2022

Related U.S. Application Data

(60) Provisional application No. 63/161,564, filed on Mar. 16, 2021.

(51) Int. Cl.
*F27D 5/00* (2006.01)
*B22F 3/00* (2021.01)
(Continued)

(52) U.S. Cl.
CPC .......... *F27D 5/0031* (2013.01); *B22F 3/003* (2013.01); *B22F 10/20* (2021.01); *B33Y 10/00* (2014.12);
(Continued)

(58) Field of Classification Search
CPC .. B22F 2003/1042; B22F 5/007; B22F 3/003; C21D 9/0025; F27D 5/0031; F27D 5/0012; F27D 5/0006; F27M 2001/1504
See application file for complete search history.

(56) References Cited

U.S. PATENT DOCUMENTS

| 3,553,800 | A | * | 1/1971 | Ploger et al. | .......... C04B 33/32 432/261 |
| 3,988,107 | A | * | 10/1976 | Koch | .................... F27D 5/0012 432/253 |

(Continued)

FOREIGN PATENT DOCUMENTS

| CN | 105339750 A | * | 2/2016 | .......... C04B 35/101 |
| DE | 29920156 U1 | * | 1/2000 | .......... F27D 5/0012 |

(Continued)

OTHER PUBLICATIONS

International Search Report and Written Opinion from corresponding International Application No. PCT/US2022/020319 dated Jun. 10, 2022.

(Continued)

*Primary Examiner* — Gregory A Wilson
(74) *Attorney, Agent, or Firm* — Lando & Anastasi, LLP

(57) ABSTRACT

An assembly for carrying parts to be sintered through a sintering furnace includes a boat formed of a refractory metal or metal alloy and including a base and, sidewalls, and a plurality of vertically stacked ceramic tiles disposed within the boat, each of the plurality of vertically stacked ceramic tiles sized to carry a plurality of the parts to be sintered through the sintering furnace.

31 Claims, 21 Drawing Sheets

(51) Int. Cl.
*B22F 3/10* (2006.01)
*B22F 10/20* (2021.01)
*B33Y 10/00* (2015.01)
*B33Y 80/00* (2015.01)
*C22C 27/04* (2006.01)

(52) U.S. Cl.
CPC .............. *B33Y 80/00* (2014.12); *C22C 27/04* (2013.01); *F27D 2005/0081* (2013.01)

(56) References Cited

U.S. PATENT DOCUMENTS

| | | | |
|---|---|---|---|
| 5,258,155 A | 11/1993 | Sekido et al. | |
| 5,533,930 A | 7/1996 | Tsuzuki et al. | |
| 5,628,849 A | 5/1997 | Fasano et al. | |
| 6,027,686 A * | 2/2000 | Takahashi | B22F 3/10 419/38 |
| 6,057,030 A * | 5/2000 | Mano | C04B 38/067 428/318.6 |
| 6,318,571 B1 | 11/2001 | Maumus et al. | |
| 6,457,971 B2 | 10/2002 | Orbeck | |
| 6,464,931 B1 * | 10/2002 | Oota | H01F 1/0557 419/38 |
| 6,696,015 B2 * | 2/2004 | Tokuhara | H01F 41/0253 419/57 |
| 9,321,104 B2 | 4/2016 | Hachenberg et al. | |
| 10,815,546 B2 * | 10/2020 | Guichard | F27D 5/0012 |
| 11,604,029 B2 * | 3/2023 | Esfehanian | F27D 5/0012 |
| 2011/0241273 A1 | 10/2011 | Chiang | |
| 2011/0286874 A1 | 11/2011 | Low et al. | |
| 2013/0309623 A1 | 11/2013 | Chou et al. | |
| 2018/0100699 A1 * | 4/2018 | Groos | F27D 3/0024 |
| 2019/0218150 A1 * | 7/2019 | Ihara | C04B 35/48 |
| 2021/0018268 A1 * | 1/2021 | Park | F27B 21/00 |
| 2021/0207888 A1 * | 7/2021 | Devoe | B28B 11/248 |
| 2022/0299268 A1 * | 9/2022 | Lange | B22F 3/225 |

FOREIGN PATENT DOCUMENTS

| | | | | |
|---|---|---|---|---|
| DE | 19923197 A1 * | 11/2000 | | B22F 3/003 |
| DE | 202016007129 U1 * | 1/2017 | | C04B 35/111 |
| JP | H0712472 A * | 1/1995 | | |
| SU | 1474425 A1 | 4/1989 | | |
| WO | WO-2012014835 A1 * | 2/2012 | | B22F 3/003 |

OTHER PUBLICATIONS

Website entitled Molybdenum Sintering Boats & Carriers, available at <https://web.archive.org/web/20210301163639/https://www.elmettechnologies.com/products/tungsten-molybdenum-boats-carriers/> (Elmet Technologies, Inc.) Mar. 1, 2021.

* cited by examiner

RACKING SYSTEM FOR USE IN CONTINUOUS SINTERING FURNACES

CROSS-REFERENCE TO RELATED APPLICATIONS

This application claims priority under 35 U.S.C. § 119(e) to U.S. Provisional Patent Application Ser. No. 63/161,564 titled "RACKING SYSTEM FOR USE IN CONTINUOUS SINTERING FURNACES," filed Mar. 16, 2021, the entire contents of which being incorporated herein by reference for all purposes.

BACKGROUND

1. Field of Invention

Aspects and embodiments disclosed herein are generally directed to systems and methods for the fabrication of mechanical parts by sintering in continuous sintering furnaces.

2. Discussion of Related Art

Materials are commonly formed into useful shapes by forming a mass of powder into a desired shape and subsequently bonding the particles together in the solid state, i.e. without total liquefaction, with the application of heat under a controlled atmosphere. Numerous processes are available for the shaping of the powders, including but not limited to uniaxial die compaction, cold isostatic pressing, powder rolling, powder extrusion, powder injection molding, and additive manufacturing (3D printing). The forming process may include an internal or external lubricant, for example, wax or a metal stearate, to form the "green" part. After using thermal decomposition or other means to remove the lubricant, the green part is subjected to high temperatures which cause the atoms in the powered material to diffuse and metallurgically bond together adjacent particles of the powder. This heating and consolidation process is known as sintering. The sintering process is applicable to consolidating shapes from a wide variety of materials including, metals, ceramics, plastics, and composites.

The sintering process may or may not result in the reduction or elimination of the pores or voids between the particles of powdered material. Green parts are most commonly sintered with very little size change, either growth or shrinkage, to maintain the desired dimensions of the part. In some instances, the green part may increase in size leading to an increase in the amount of porosity, while in other instances a reduction in the amount of porosity will lead to shrinkage. When shrinkage occurs, it is generally desirable that the density variations within the part be minimized and the uniformity of the heat applied to the part be maximized to prevent or minimize distortion to achieve the final desired dimensional tolerances.

Sintering may be performed in one of various types of ovens or furnaces depending on various factors such as the time and temperatures needed to affect a desired density or mechanical strength of a part to be sintered, the size of the part, and the material or materials included in the green part. Parts may be placed in a furnace or kiln and be sintered in place without moving. In high volume manufacturing, however, parts are often continuously passed through a sintering furnace from an inlet to an outlet and loaded and unloaded manually or using specialized material handling equipment.

A "belt furnace" uses a continuous belt (usually metal) on rolls at each end of the furnace to pull trays of parts through the furnace. The trays ride on the belt and the belt drags across the furnace floor (hearth plates). These furnaces are typically limited to lower temperature sintering (<2150° F. max) due to temperature limitations of the metal belt. Ceramic belt furnaces using alumina or silicon carbide links are in limited use for higher temperature sintering but have load carrying limitations.

A "pusher" furnace uses a mechanical push rod to push a long train of ceramic or metal tiles or boats housing parts to be sintered through the furnace. The tiles or boats are not connected but pushed back-to-back through the furnace, sliding directly across the furnace floor (hearth plates). These furnaces can run at higher temperature than metal belt furnaces and carry heavier loads than ceramic belt furnaces.

"Roller hearth" furnaces can carry heavy loads of parts through the furnace in baskets or boats (the ceramic industry uses the term "saggers") across a series of rollers through the furnace. They are used extensively by the ceramic industry in sintering kilns.

"Walking beam" furnaces have a beam that runs through the furnace that picks the trays up, walks them forward, then sets them down again. They can carry heavier loads than pusher furnaces at high temperature, but have a high upfront capital cost and on-going maintenance with regard to minimizing or eliminating leakage around "bellows"—the seals around the moving parts that walk the beam forward.

Continuous sintering furnaces typically include three zones, a first "preheat zone" for heating the parts to the desired sintering temperature, a second "high heat zone" for holding the parts at the desired sintering temperature, and a third "cooling zone" for cooling the parts back to room temperature. The "time at temperature" may range from a few minutes to several hours depending on the length of high heat zone and the chosen push rate through the furnace. In non-limiting examples, sintering furnaces may be 30 to 70 feet long, with parts spending several hours passing through the furnace, typically with less than half the time in the furnace spent in the high heat section.

SUMMARY

In accordance with one aspect, there is provided an assembly for carrying parts to be sintered through a sintering furnace. The assembly comprises a boat formed of a refractory metal or metal alloy and including a base and sidewalls and a plurality of vertically stacked ceramic tiles disposed within the boat, each of the plurality of vertically stacked ceramic tiles sized to carry a plurality of the parts to be sintered through the sintering furnace.

In some embodiments, the plurality of vertically stacked ceramic tiles are foamed ceramic tiles.

In some embodiments, the plurality of vertically stacked ceramic tiles are fiberboard.

In some embodiments, the plurality of vertically stacked ceramic tiles have a density of less than 3.5 $g/cm^3$.

In some embodiments, the plurality of vertically stacked ceramic tiles have a density of less than 2.0 $g/cm^3$.

In some embodiments, the assembly further comprises standoffs disposed between and maintaining vertical separation between adjacent ones of the plurality of vertically stacked ceramic tiles.

In some embodiments, the standoffs comprise ceramic.

In some embodiments, the standoffs are disposed within apertures defined in the plurality of parts to be sintered.

In some embodiments, the assembly further comprises a boat lid formed of a refractory metal or metal alloy.

In some embodiments, the lid includes a plurality of apertures.

In some embodiments, the assembly further comprises a top cap formed of one of a refractory metal, a metal alloy, or of a ceramic material.

In some embodiments, the top cap is configured to be supported by standoffs disposed on an uppermost ceramic tile disposed within the boat.

In some embodiments, the refractory metal comprises or consists of molybdenum.

In some embodiments, the refractory metal comprises or consists of lanthanated molybdenum (MoLa).

In some embodiments, the sidewalls include a plurality of apertures.

In some embodiments, the plurality of apertures are uniformly spaced on the sidewalls.

In some embodiments, the plurality of apertures are distributed non-uniformly on the sidewalls to adjust the radiant energy and gas flow to the parts.

In some embodiments, the assembly further comprises one or more slots defined in lower portions of the sidewalls.

In some embodiments, the plurality of vertically stacked ceramic tiles each include a plurality of recesses configured to retain the plurality of parts to be sintered.

In some embodiments, the sidewalls include slots through which the plurality of vertically stacked ceramic tiles may be accessed for loading and removal from the boat.

In some embodiments, a lowermost of the plurality of vertically stacked ceramic tiles has a greater mechanical strength than an uppermost of the plurality of vertically stacked ceramic tiles.

In some embodiments, the lowermost of the plurality of vertically stacked ceramic tiles has a one of a greater thickness or a greater density than the uppermost of the plurality of vertically stacked ceramic tiles.

In some embodiments, a lowermost of the plurality of vertically stacked ceramic tiles has a same thickness as an uppermost of the plurality of vertically stacked ceramic tiles.

In some embodiments, the plurality of vertically stacked ceramic tiles includes at least three vertically stacked ceramic tiles.

In some embodiments, each of the plurality of vertically stacked ceramic tiles carry a same number of the plurality of the parts to be sintered.

In some embodiments, one of the plurality of vertically stacked ceramic tiles carries a different number of the plurality of the parts to be sintered than another of the plurality of vertically stacked ceramic tiles.

In some embodiments, the number of the plurality of parts to be sintered are oriented in a same position on each of the plurality of vertically stacked ceramic tiles.

In some embodiments, the number of the plurality of parts to be sintered are oriented in a different position on one of the plurality of vertically stacked ceramic tiles than on another of the plurality of vertically stacked ceramic tiles.

In accordance with another aspect, there is provided a method of sintering parts. The method comprises mounting a plurality of the parts within a carrier including a boat formed of a refractory metal or metal alloy and including a base and sidewalls and a plurality of vertically stacked ceramic tiles disposed within the boat, each of the plurality of vertically stacked ceramic tiles sized to carry a plurality of parts to be sintered through the sintering furnace, and passing the carrier through a sintering furnace heated to a temperature sufficient to sinter the parts.

In some embodiments, the method further comprises forming the plurality of parts to be sintered by compactifying one or more powdered materials.

In some embodiments, the method further comprises forming the plurality of parts to be sintered by metal injection molding.

In some embodiments, the method further comprises forming the plurality of parts to be sintered by additive manufacturing.

In some embodiments, the method further comprises mounting the plurality of parts to be sintered on the plurality of ceramic tiles.

In some embodiments, the method further comprises mounting standoffs within apertures defined within the plurality of parts to be sintered.

In some embodiments, the method further comprises stacking the plurality of ceramic tiles including the plurality of parts to be sintered and standoffs within the boat.

In some embodiments, the method further comprises operating the sintering furnace at a lower temperature than would be utilized if the parts were passed through the sintering furnace on a full density ceramic plate without a boat.

In accordance with another aspect, there is provided a method of retrofitting a sintering system. The method comprises replacing carriers used to transport parts to be sintered through the sintering furnace with carriers including a boat formed of a refractory metal or metal alloy and including a base and sidewalls, and a plurality of vertically stacked ceramic tiles disposed within the boat, each of the plurality of vertically stacked ceramic tiles sized to carry a plurality of parts to be sintered through the sintering furnace.

In some embodiments, the method further comprises producing more sintered parts per hour in the sintering furnace than prior to retrofitting the sintering furnace.

In some embodiments, the method further comprises operating the sintering furnace at a lower temperature than prior to retrofitting the sintering furnace.

In some embodiments, the method further comprises producing sintered parts in the sintering furnace with less dimensional variability than prior to retrofitting the sintering furnace.

In some embodiments, the method further comprises operating the sintering furnace with fewer jams than prior to retrofitting the sintering furnace.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
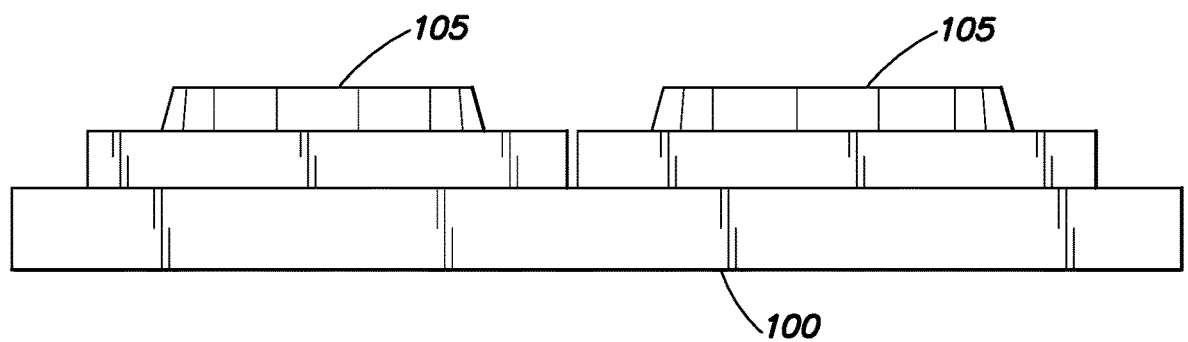
FIG. 1 illustrates an example of a tile for carrying parts through a sintering furnace.

Aspects and embodiments disclosed herein are not limited to the details of construction and the arrangement of components set forth in the following description or illustrated in the drawings. Aspects and embodiments disclosed herein are capable of being practiced or of being carried out in various ways. Also, the phraseology and terminology used herein is for the purpose of description and should not be regarded as limiting. The use of "including," "comprising," "having," "containing," "involving," and variations thereof herein is meant to encompass the items listed thereafter and equivalents thereof as well as additional items.

One or more aspects disclosed herein relate to systems and methods for housing and conveying parts to be sintered through a sintering furnace. Parts to be sintered are typically supported by some form of carrier when passing through a sintering furnace. The carrier may provide mechanical support to help the part undergoing sintering maintain a desired shape and may help distribute heat evenly across the part so that it sinters evenly. One form of support may be a ceramic plate or tile. The part or parts to be sintered may be placed directly on top of the ceramic plate and carried through a furnace on the ceramic plate. The ceramic plate or tile may be formed of a material such as alumina or another form of ceramic material that can withstand the high temperatures often used to sinter metal parts, for example, up to 2700° F. or higher. An example of this type of support is illustrated in FIG. 1 at 100. The plate or tile 100 may be formed of, for example, alumina or zirconia stabilized alumina. The plate or tile 100 may support one or more parts 105 to be sintered as the plate or tile is passed through a sintering furnace. The plate or tile 100 may be about 1 inch thick in some embodiments, although thinner or thicker tiles may also be used. The lateral dimensions of the plate or tile 100 may be determined based on the width of the internal volume of the furnace with which the plate or tile 100 is intended to be used, for example, about 12 inches wide in some implementations. In some instances, coatings may be applied to the tiles to prevent chemical interactions between the tile and the parts to be sintered on the tile.

Figure 2A:
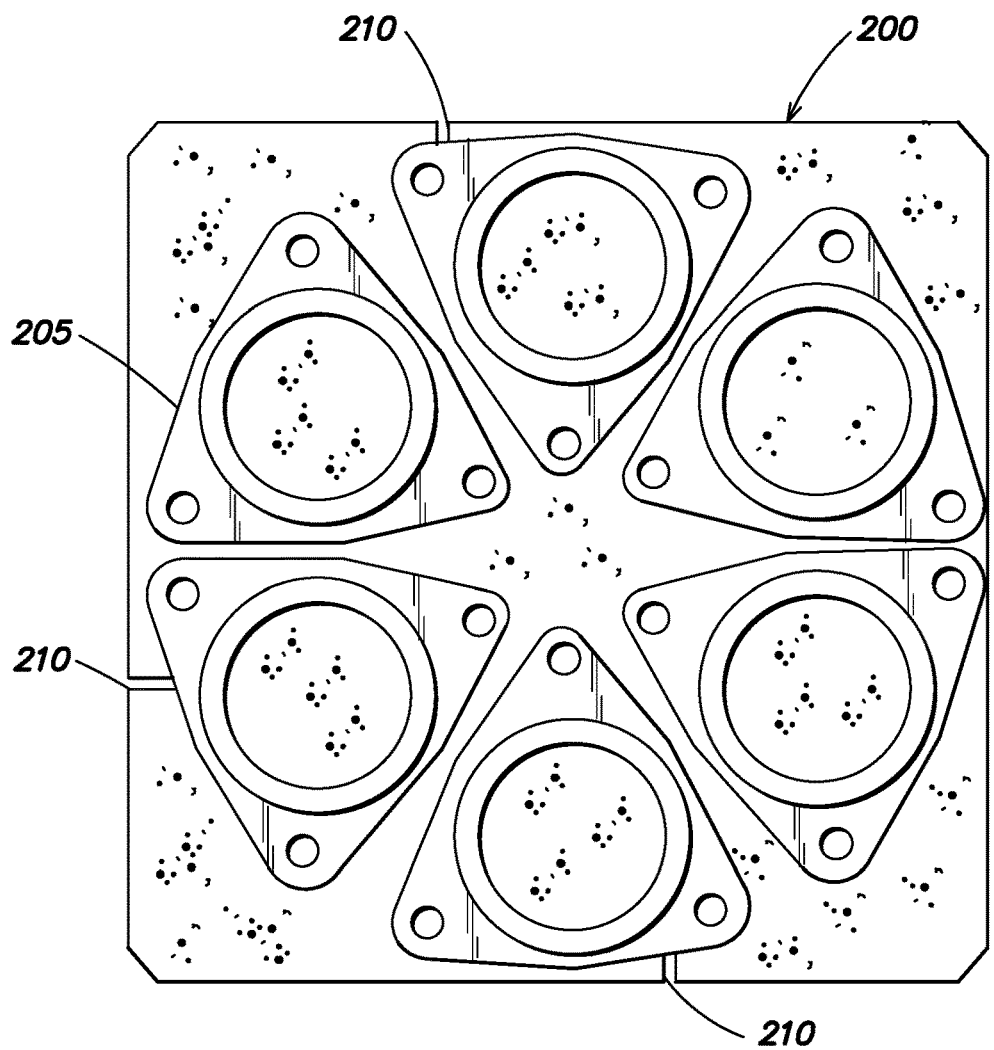
FIG. 2A is a plan view of a dense alumina ceramic tile for carrying parts through a sintering furnace having six parts placed on the surface of the tile.
Figure 2B:
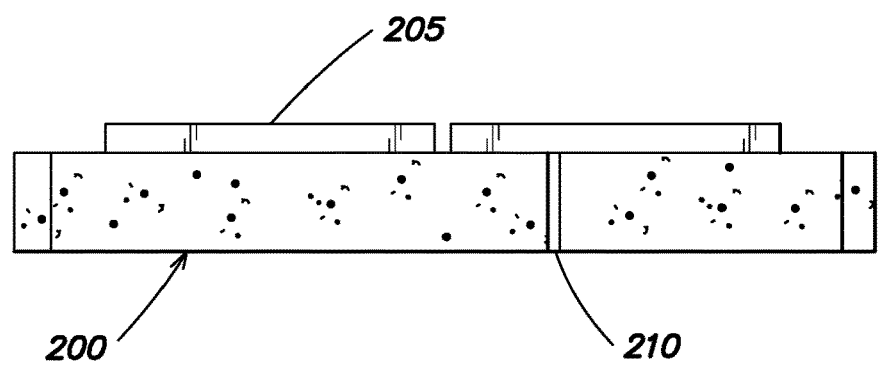
FIG. 2B is an elevational view of the tile of FIG. 2A.

The arrangement shown in FIGS. 1, 2A, and 2B presents both advantages and limitations with respect to sintering cost, effectiveness, and productivity. The simplicity of single layer stacking can be effective in minimizing size change differences between parts with adequate sintering temperature and time-at-temperature. However, this comes at the expense of lower productivity compared to stacking multiple trays in the furnace, unless the process is designed aggressively to run at higher temperatures and faster speeds, placing more stress on the furnace and tiles. Stacking tiles can increase productivity of the sintering process by increasing the number of parts/hour that can be sintered, but this increased throughput comes at the expense of increased complexity of the stack, increased variation in the energy absorbed by each part as a function of location within the stack, and increased chances for catastrophic failure of the stack that can result in furnace jams and costly maintenance. A racking system for continuous sintering furnaces desirably minimizes the risk of furnace jams by preventing jams due to broken tile or parts falling off of the tiles, optimizes thermal shielding to control the amount of direct radiation from the heating elements to the parts, balances the energy input to the parts from the top to the bottom of the stack, and allows the process gases to flow freely around the parts. Such a racking system may be comprised of a metal containment box made of a refractory material such as molybdenum, titanium-zirconium stabilized molybdenum ("TZM"), or lanthanum oxide stabilized molybdenum (lanthanated molybdenum, or "MoLa") in conjunction with trays that may be ceramic, graphite, or metal. If the trays are graphite or metal, coatings may be utilized to prevent reaction between the parts and the trays.

A plate or tile as illustrated in FIG. 1 is typically formed of a solid plate of dense ceramic material. This type of dense tile is well suited for withstanding the high compressive loads applied to the tiles as they are pushed back-to-back through the furnace. In other implementations, a sintering parts support, for example, a plate or tile, may be formed of a lower density ceramic to reduce mass, such as cordierite, fiber board, or foamed ceramic (also referred to in the industry as porous ceramic) material. The pores in the foamed ceramic tile may allow for air to move through the tile from hotter to cooler areas and help maintain uniform temperature across the tile. A foamed ceramic tile will also typically have less mass and less heat capacity than a similar tile formed from solid ceramic, which may lessen the time needed to heat or cool a foamed ceramic carrier and supported parts in a sintering oven. One example of a foamed ceramic tile 200 for carrying parts to be sintered through a sintering furnace is illustrated in plan view in FIG. 2A and in elevational view in FIG. 2B. The tile 200 is illustrated with six parts 205 placed on the upper surface of the tile 200. The parts 205 may be formed of, for example, powdered stainless steel or another metal. In operation the parts 205 may be placed on the surface of the tile 200 either by a part loading apparatus or by hand, for example, through a window fixture. The tile 200 may be formed of any appropriate material, for example, alumina, zirconia toughened alumina, yttria stabilized zirconia/alumina, calcia/magnesia stabilized zirconia, calcia stabilized zirconia, magnesia stabilized zirconia or another ceramic and may have a thickness ranging from 0.5 inches to 1 inch and lateral dimensions sized to fit a particular model of sintering furnace. The porosity, for example, pore size and total void space (fraction of the volume of the tile occupied by pores rather than actual material), of the tile 200 may be selected to provide a desired level of mechanical strength, heat capacity, and thermal conductivity. In certain non-limiting examples, the tile 200 may have about 30 pores per inch. Foamed ceramic tiles formed of these materials and with these porosities are available from, for example, Selee Corporation, Hendersonville, NC.

In some embodiments, the foamed ceramic tile 200 may include one or more expansion slots 210 defined in portions of the tile 200, for example, extending inward from edges of the tile 200 as illustrated in FIG. 2A. The expansion slots 210 may provide for reduction of stress and reduced tendency for the tile 200 to crack when the tile 200 expands when heated in a sintering furnace.

In other embodiments, rather than utilizing a foamed ceramic tile for supporting parts to be sintered in a sintering furnace a low-density ceramic tile having a density of, for example, less than 3.5 g/cm$^3$ or less than 2.0 g/cm$^3$ may be utilized. Example of such ceramic tiles may be formed of fiberboard alumina, fiberboard alumina silicate, or fiberboard configurations of any of the other ceramic materials referenced above.

Figure 3A:
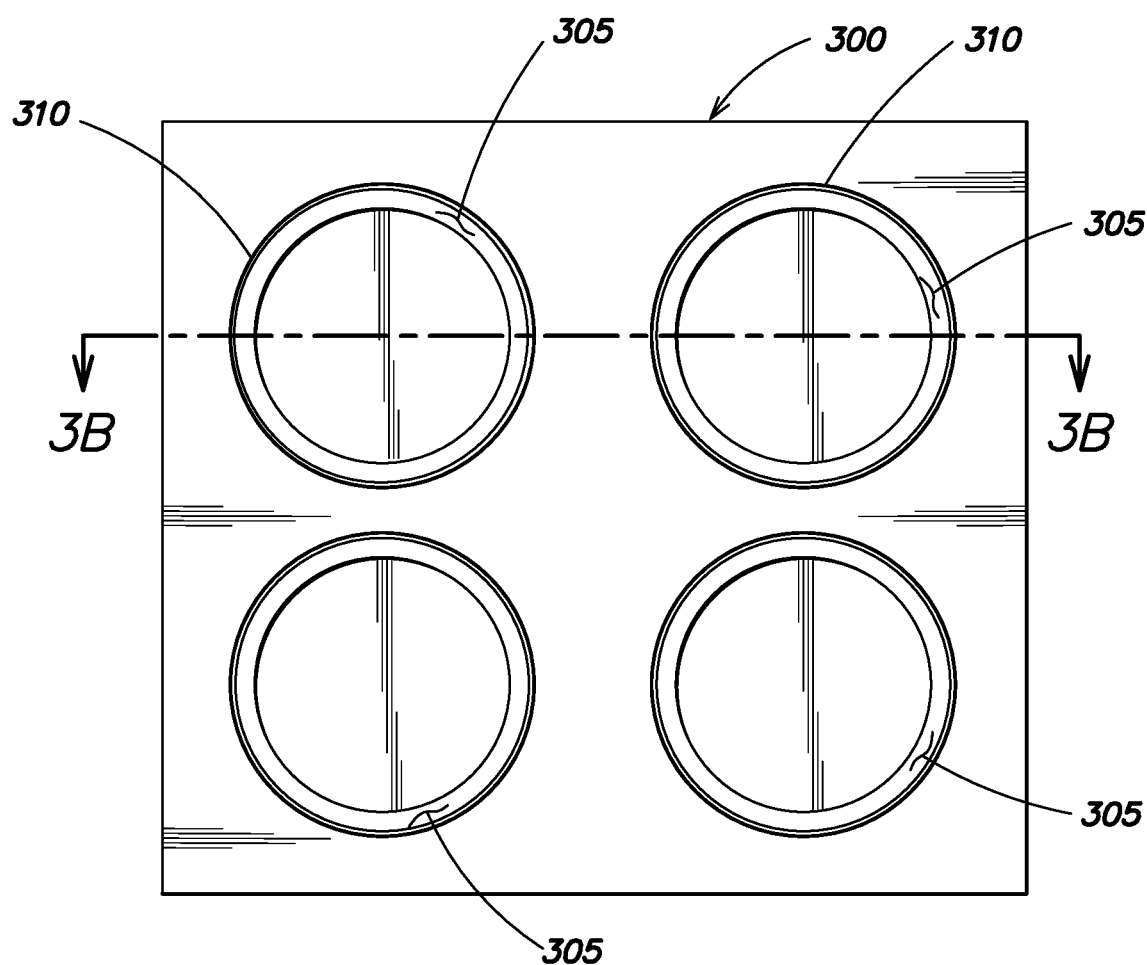
FIG. 3A is a plan view of an alternate ceramic tile design.
Figure 3B:
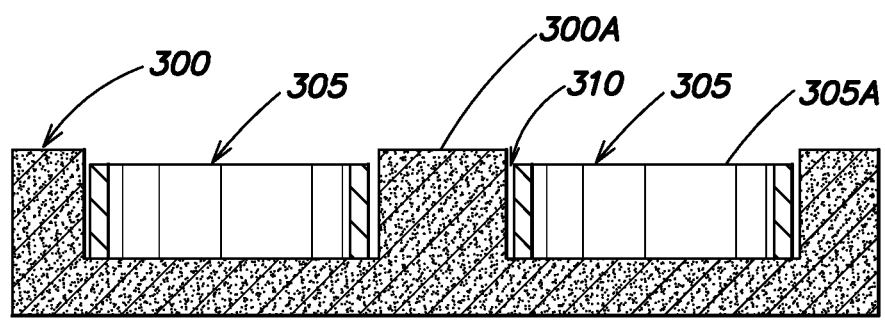
FIG. 3B is a cross-section of a portion of the ceramic tile of FIG. 3A.

In some embodiments, rather than placing the parts to be sintered on an upper surface of a support tile, tiles may be provided with recesses for receiving the parts to be sintered. FIGS. 3A and 3B illustrate a tile 300, which may be formed of a foamed ceramic or low-density ceramic as discussed above, that includes recesses 310 for parts 305. The parts 305 may fit entirely within the recesses so that the top surfaces of the parts 305A lie at or below the level of the top surface 300A of the tile 300.

Figure 4A:
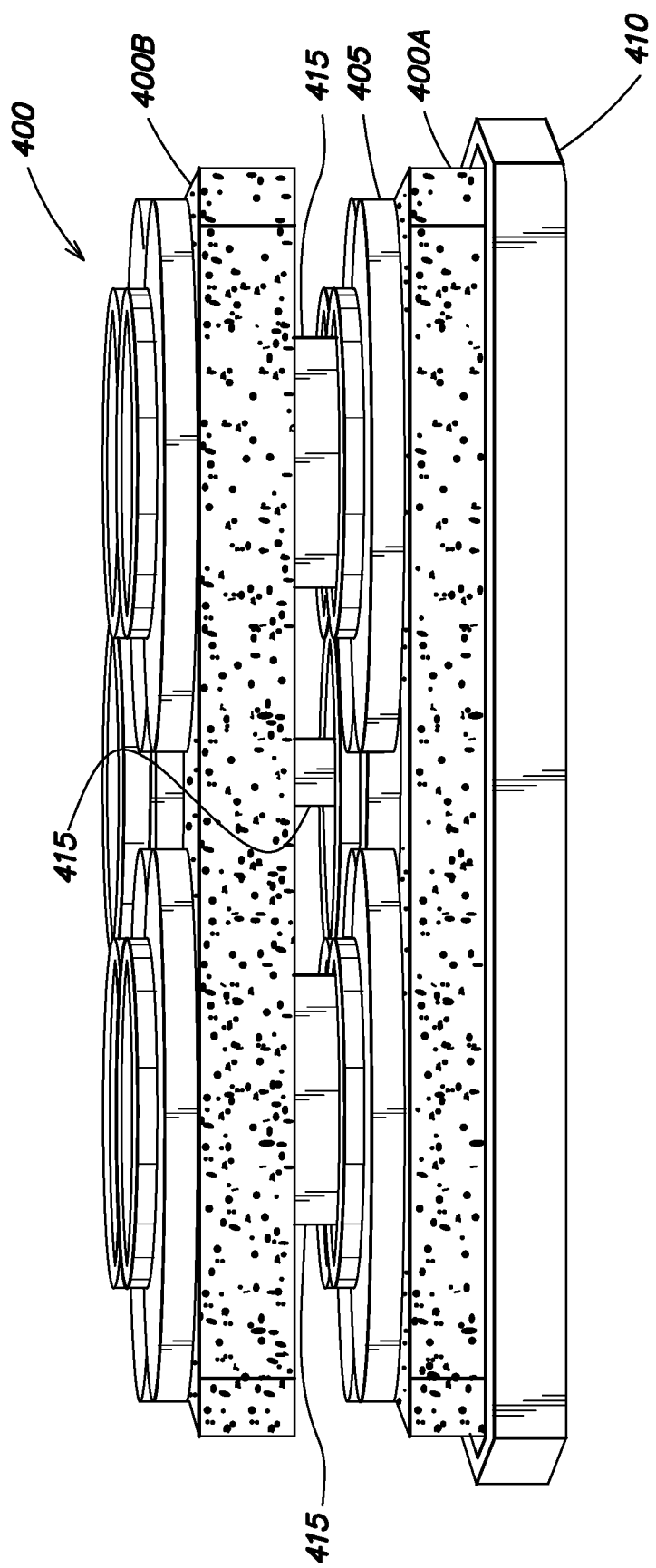
FIG. 4A is an elevational view of an example of a parts sintering support structure including two stacked tiles.
Figure 4B:
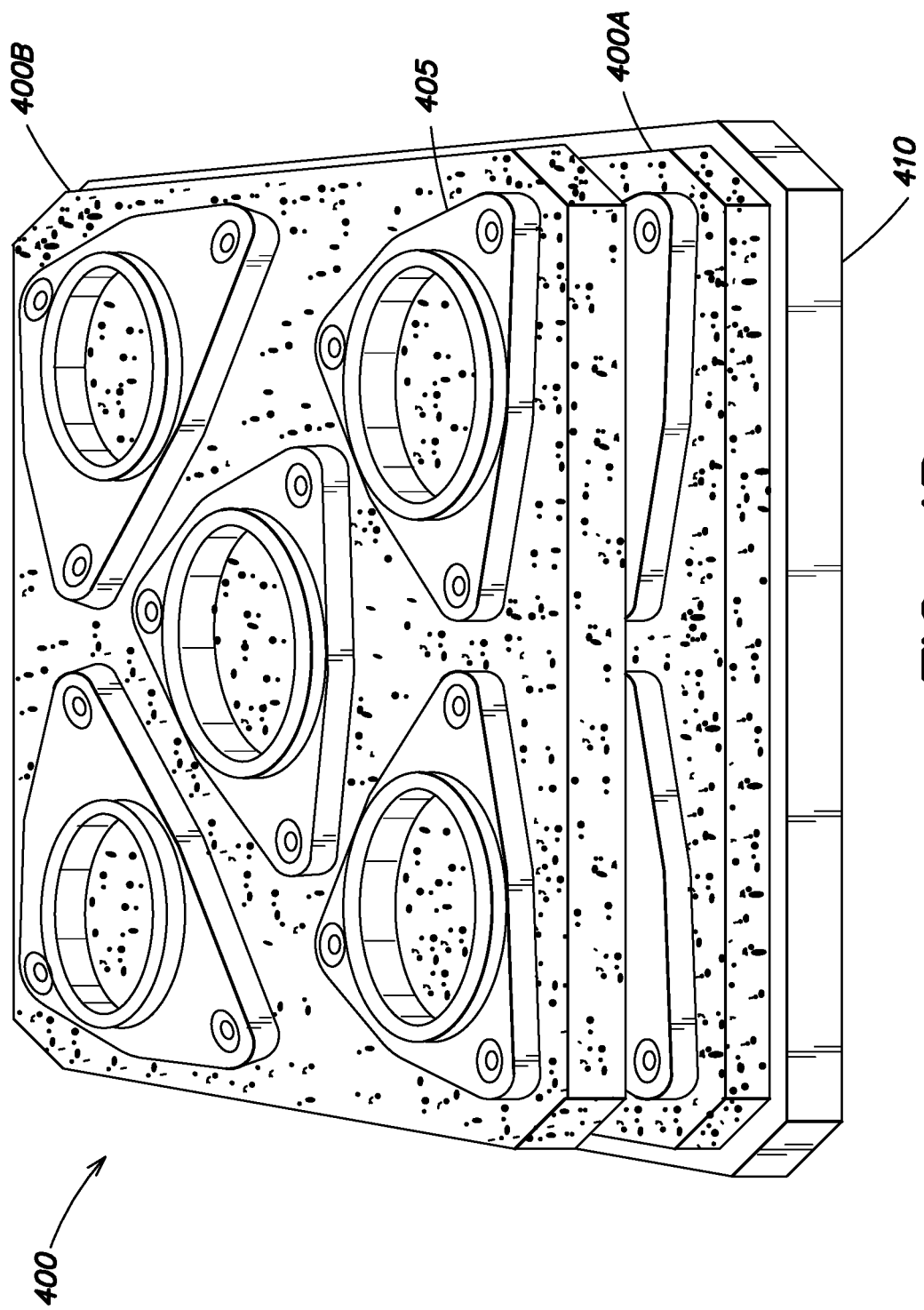
FIG. 4B is a view of the parts sintering support structure of FIG. 4A from a different perspective.

To increase the production capacity of a sintering furnace (parts sintered/hour) for a given furnace width, one may utilize stacked sintering supports instead of single tiles. FIGS. 4A and 4B illustrate an embodiment of a stacked parts sintering support structure 400. The structure 400 includes two ceramic tiles 400A, 400B, each designed to hold five parts 405, although the number of parts supported on each tile may vary based on the relative sizes of the parts and tiles. Tile 400A is a lower support tile that in some embodiments may be disposed within a metal, for example, molybdenum, TZM, or MoLa boat 410 such as one of those available from H. C. Starck Inc., Newton, MA or Elmet Technologies, Lewiston, ME Tile 400B is an upper tile that is supported above the lower tile 400A and parts 405 on the lower tile 400A by supports 415. The supports 415 may be placed between the parts 405 on the lower tile 400A or within orifices defined in the parts 405. The supports 415 may in some embodiments be formed of foamed ceramic or low-density ceramic like the tiles 400A, 400B, or alternatively may be solid blocks of ceramic or other refractory material. The vertical space between the tiles 400A, 400B may be selected to be as small as possible while providing for the lower surface of the upper tile 400B to be above the upper surfaces of the parts 405 placed on the lower tile 400A. Although only two layers of tiles 400A, 400B are illustrated in FIGS. 4A and 4B, other embodiments may include additional stacked tiles to form a support structure with, for example, 3-5 or more vertically stacked tiles. The number of tiles that may be stacked in a parts sintering support structure may be limited only by the height of the internal volume of the sintering furnace in which it is to be used.

In some embodiments, lower tiles, for example, lower tile 400A in FIGS. 4A and 4B may be thicker, less porous, or more dense than upper tiles, for example, tile 400B in FIGS. 4A and 4B to provide sufficient mechanical strength to support the upper tiles without cracking. In some non-limiting examples, a lower or base tile, for example, lower tile 400A in FIGS. 4A and 4B may have a thickness of about 0.75 inches while upper tiles, for example, tile 400B in FIGS. 4A and 4B may have a thickness of about 0.5 inches. In other embodiments all tiles in a stack may have the same thickness and/or same length and width dimensions and/or porosity and/or density. Tile material, thickness, and spacing may be varied to optimize the thermal profile around the parts.

Figure 5:
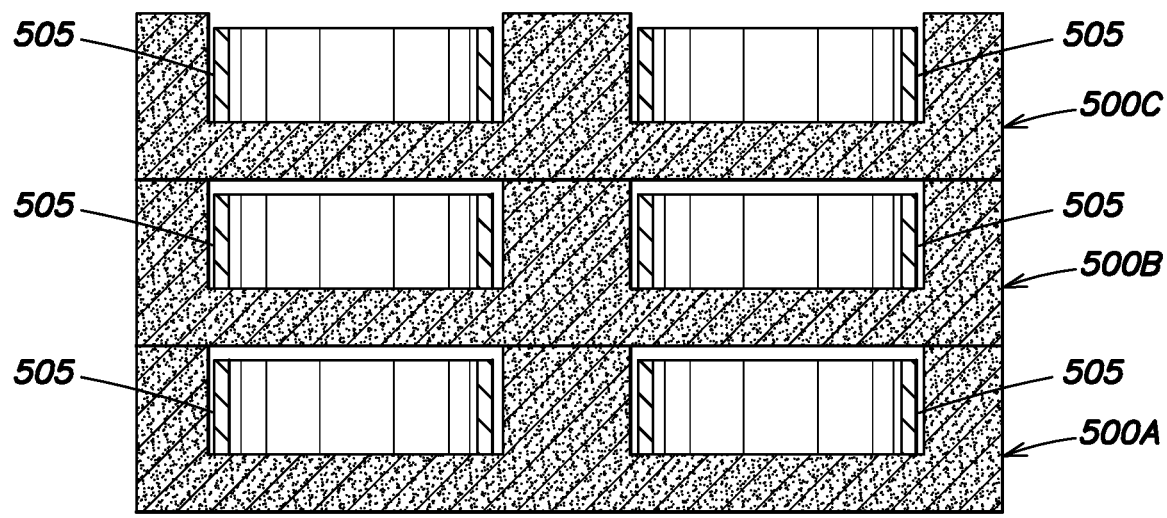
FIG. 5 is an illustration of a plurality of the ceramic tile of FIGS. 3A and 3B in a stacked configuration.

In embodiments including tiles with recesses for retaining parts to be sintered, for example, as illustrated in FIGS. 3A and 3B, tiles may be stacked directly on one another without any supports between the tiles, for example, as illustrated in FIG. 5 having stacked tiles 500A, 500B, 500C, each housing one or more parts 505.

Sintering furnaces often have heating elements disposed along the sides of their internal volumes. For part support structures such as illustrated in any of the figures above, portions of the parts on the support structures may be closer to the sides of the support structures, and, accordingly, to the heating elements of the sintering furnaces than other portions as the support structures pass through the sintering furnace. The parts may thus potentially sinter unevenly, resulting in parts with differing size, density, or material microstructure. In some embodiments, the support structures and parts may be disposed within a box-like container formed of a refractory metal, for example, molybdenum, TZM, or MoLa.

Figure 6A:
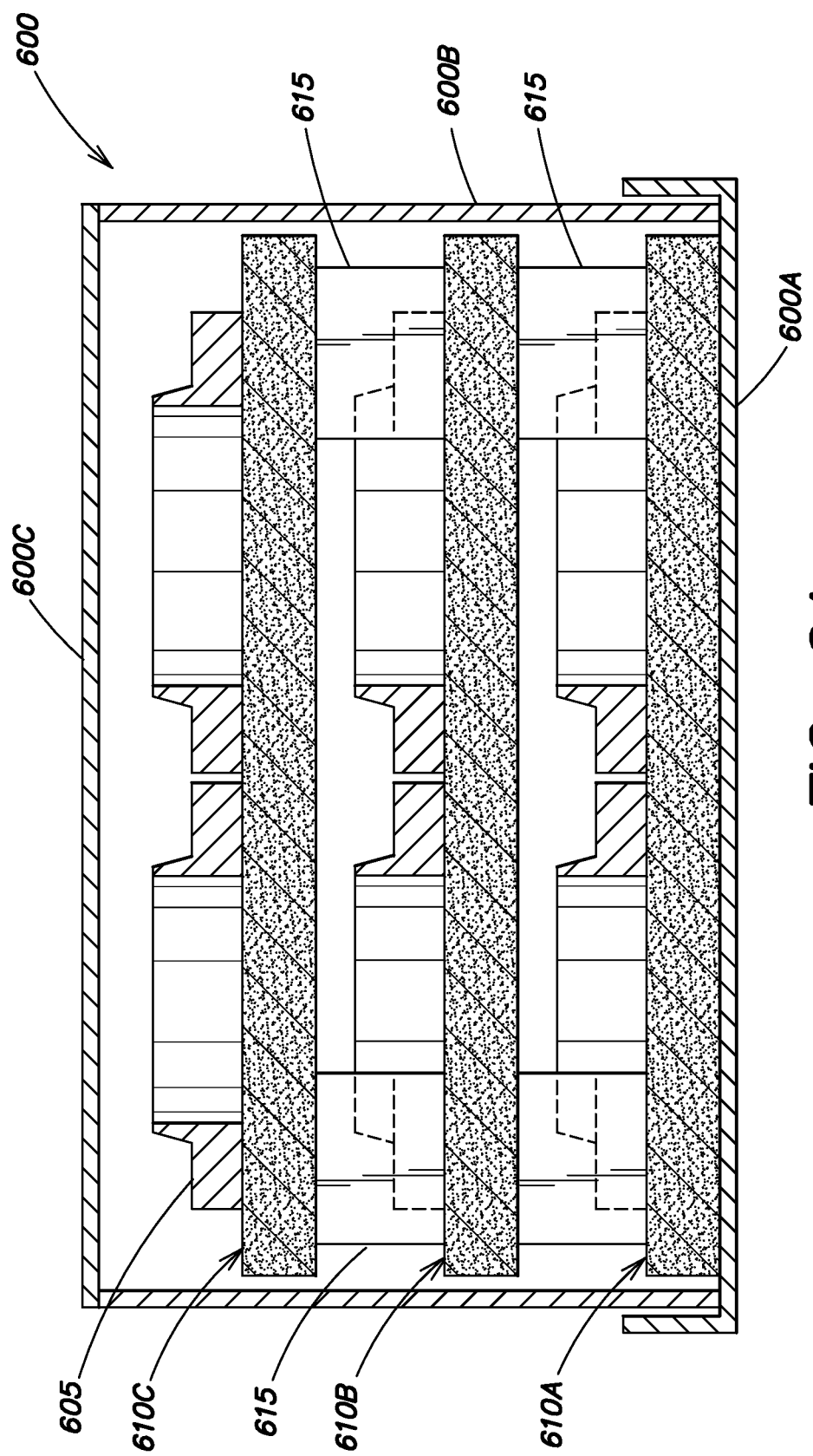
FIG. 6A is a cross-sectional view of an example of a parts sintering support structure including stacked tiles within a metal boat.

One example of such a racking system is illustrated in FIG. 6A. The racking system includes a MoLa boat 600 with a base 600A, sidewalls 600B, and a top cover or lid 600C. Disposed within the boat 600 is a stacking layer system of ceramic tiles 610A, 610B, 610C that is used to rack the parts 605 and maximize the use of the volume of space within the boat 600. The lid 600C and side walls 600B contain openings or apertures 600H (See FIGS. 7E, 7F, and 8A-8C below) to allow the furnace atmosphere to freely flow around the parts 605. The side walls 600B and lid 600C of the boat 600 act as both a heat shield to prevent direct radiation of energy from the furnace heating elements to the parts 605 and a secondary radiator of energy to the parts 605 for better distribution of heat within the boat 600. The ceramic tiles 610A, 610B, 610C minimize the thermal mass or heat capacity of the system. Standoffs 615, which may also be formed of foamed ceramic, low-density ceramic, or of full-density ceramic or another refractory material, maintain vertical separation between the ceramic tiles 610A, 610B, 610C. The standoffs 615 are shown as partially transparent in FIGS. 6A and 6B to show the position of portions of the parts 605 within the boat 600. As in the stacked parts sintering support structure 400, the lowermost tile 610A may be thicker, less porous, or more dense than the upper tiles 610B, 610C. The lowermost tile 610A may be, for example, 0.75 inches thick while each of the upper tiles 610B, 610C may be 0.5 inches thick. The dimensions of the boat 600 may be set based on the internal volume of a sintering furnace with which it is to be used. In one example, the boat 600 may be about 5 inches tall and about 12 inches in length and/or width.

Figure 6B:
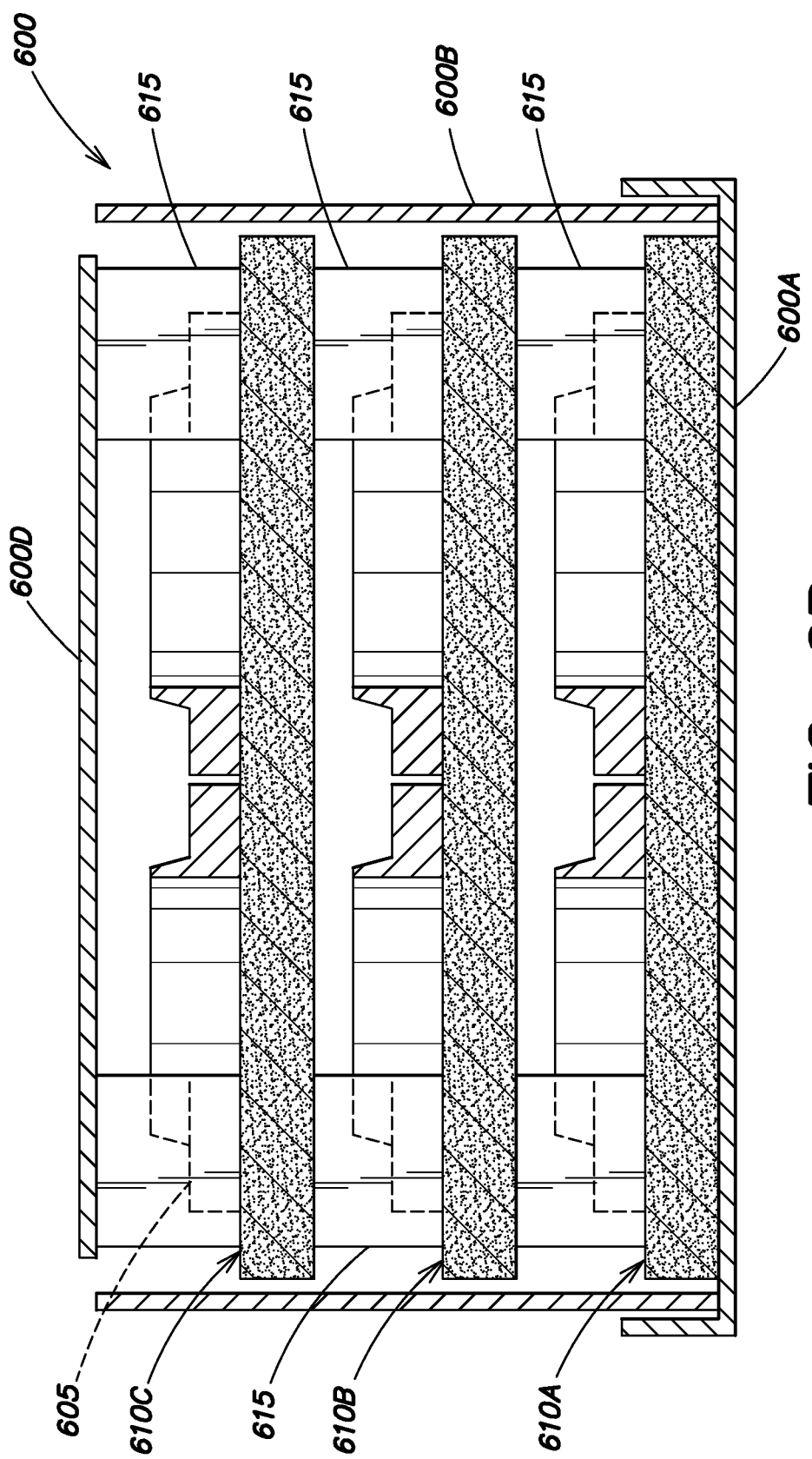
FIG. 6B is a cross-sectional view of another example of a parts sintering support structure including stacked tiles within a metal boat.

In other examples the boat 600 may be used without a metal lid, but rather, as illustrated in FIG. 6B, additional standoffs 615 may be provided on the uppermost tile 610C to support a cover plate 600D that may be formed of a metal that may be the same or different from the metal from which the boat 600 is formed. The cover plate 600D may alternatively be formed of a ceramic material that may be the same or different than the material of any one or more of the ceramic tiles 610A, 610B, 610C and that may have the same or different thickness than any one or more of the ceramic tiles 610A, 610B, 610C.

An advantage of the molybdenum, TZM, or MoLa boat parts carrier structure 600 is that the boat 600 may contain portions of the ceramic tiles 610A, 610B, 610C should one or more of these tiles break within the furnace. This helps avoid production downtime that might be called for if, for example, a tile that was not contained in a boat broke while within a sintering furnace and the furnace was shut down for maintenance to remove the broken tile pieces to avoid furnace jams.

Figure 7A:
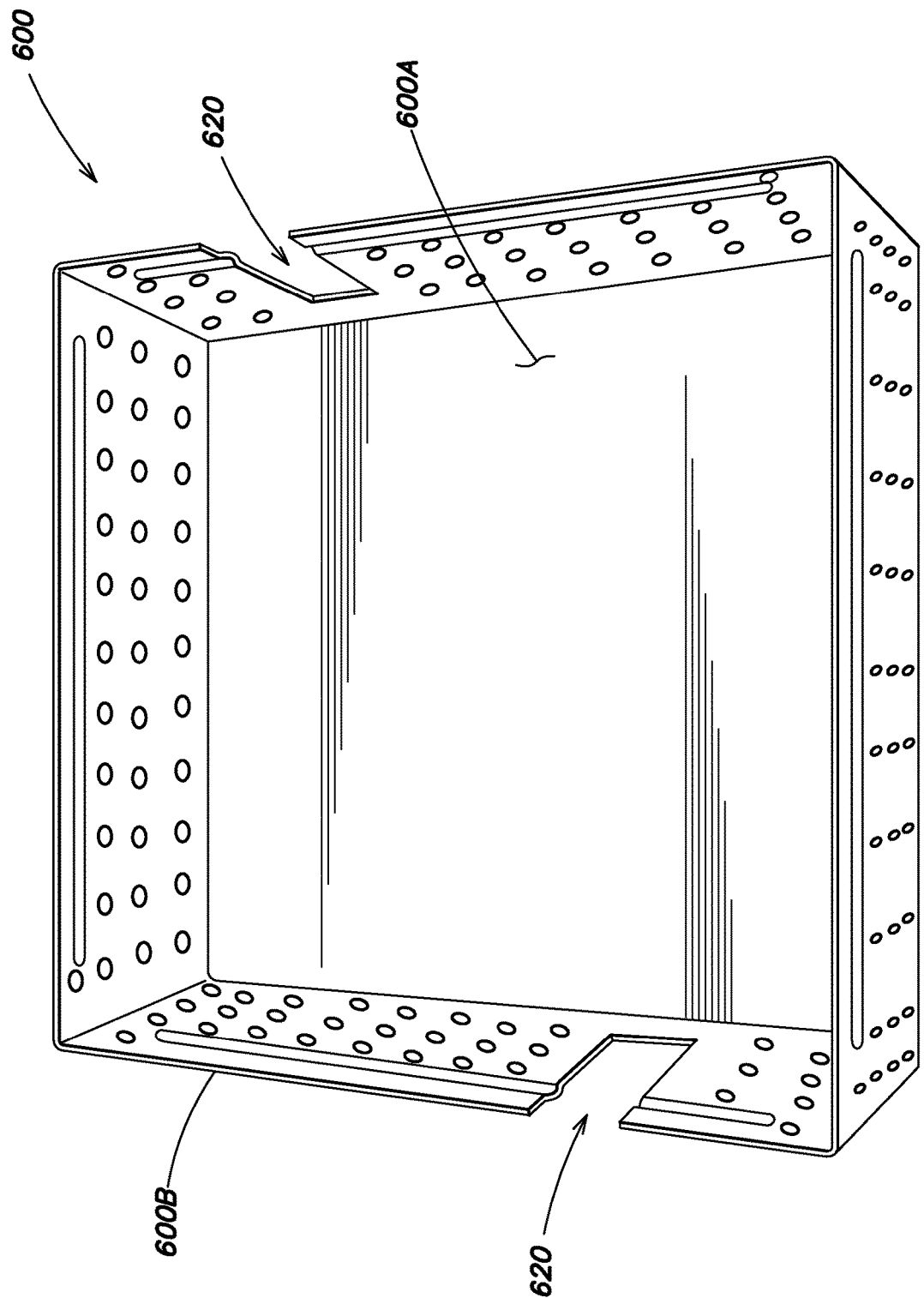
FIG. 7A illustrates an internal portion of the parts sintering support structure of FIG. 6A or 6B without ceramic tiles, parts, or standoffs.
Figure 7B:
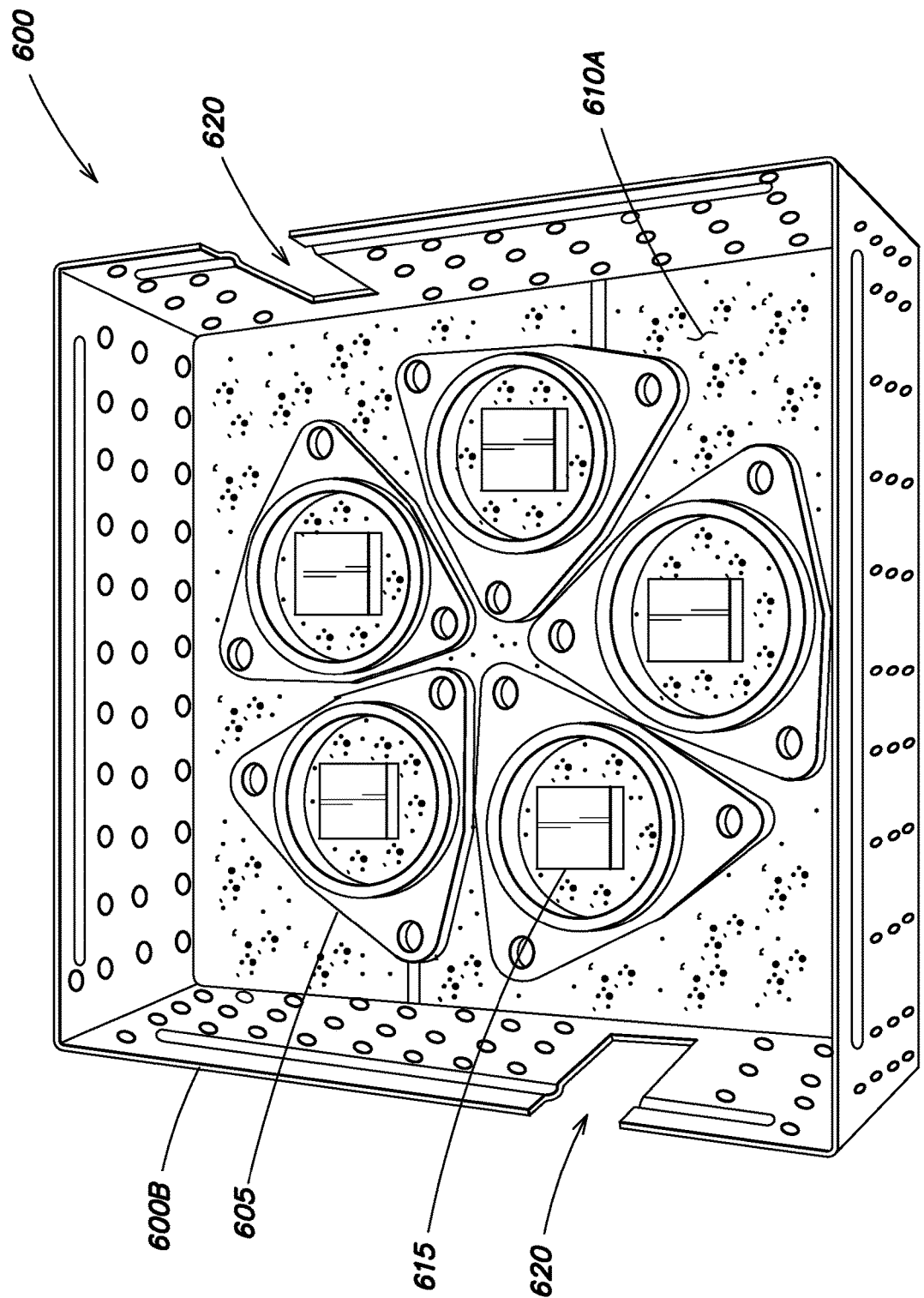
FIG. 7B illustrates the parts sintering support structure of FIG. 7A in which a lower tile and associated parts and standoffs are disposed within the metal boat.
Figure 7C:
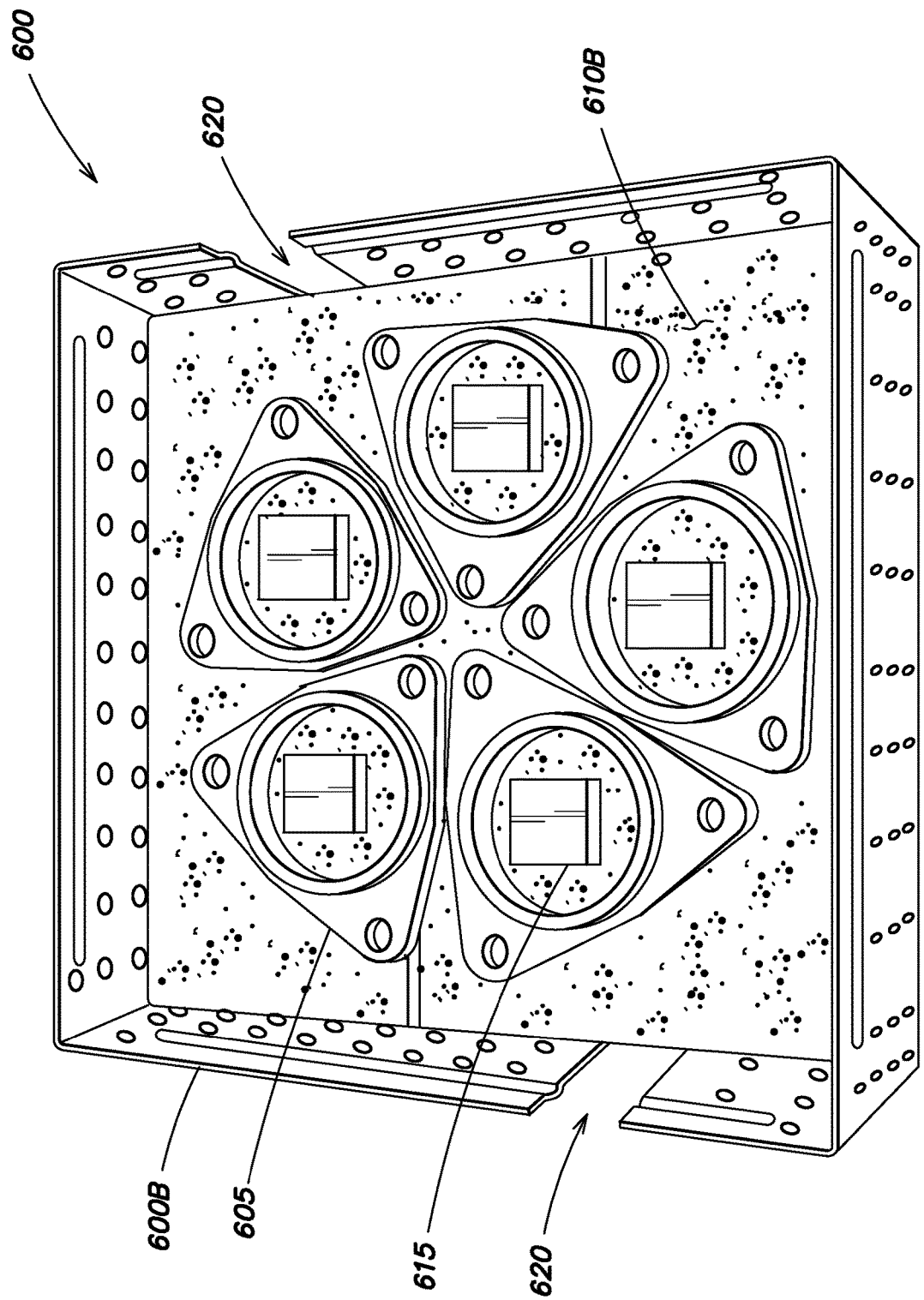
FIG. 7C illustrates the parts sintering support structure of FIG. 7B in which a middle tile and associated parts and standoffs are disposed on the lower tile and associated parts and standoffs within the metal boat.
Figure 7D:
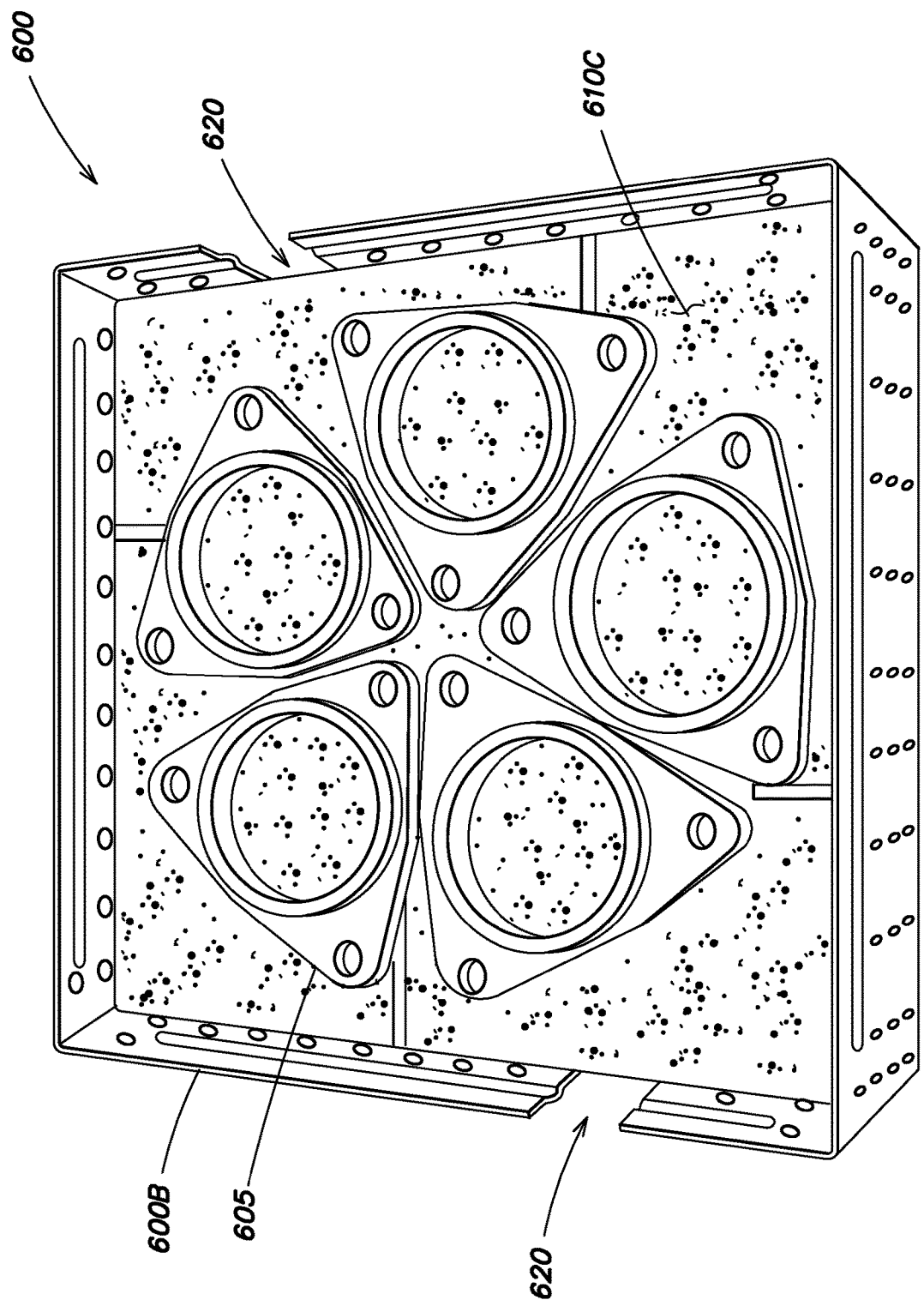
FIG. 7D illustrates the parts sintering support structure of FIG. 7C in which an upper tile and associated parts is disposed on the middle tile and associated parts within the metal boat.
Figure 7E:
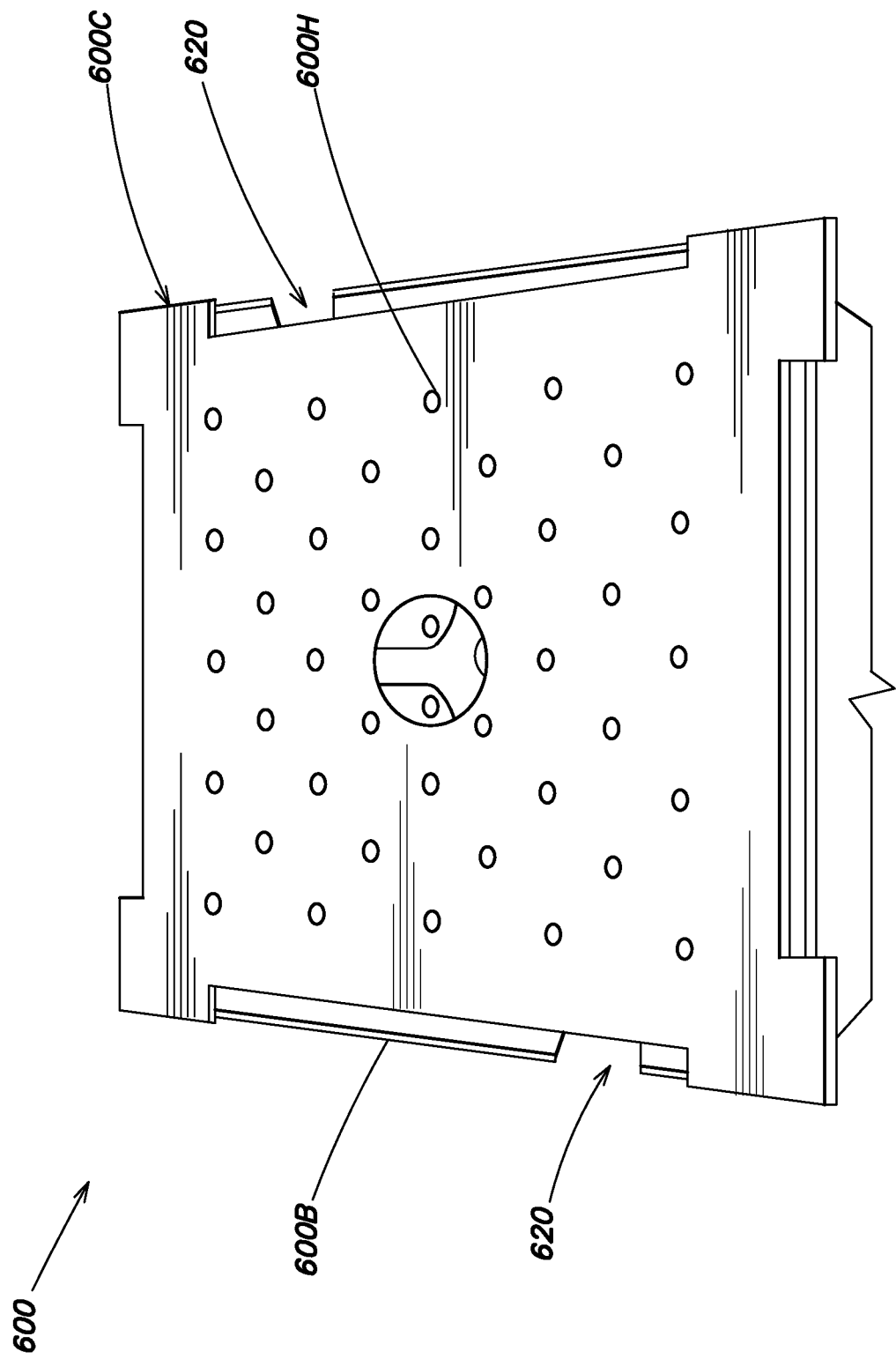
FIG. 7E illustrates the parts sintering support structure of FIG. 7D further including a lid.
Figure 7F:
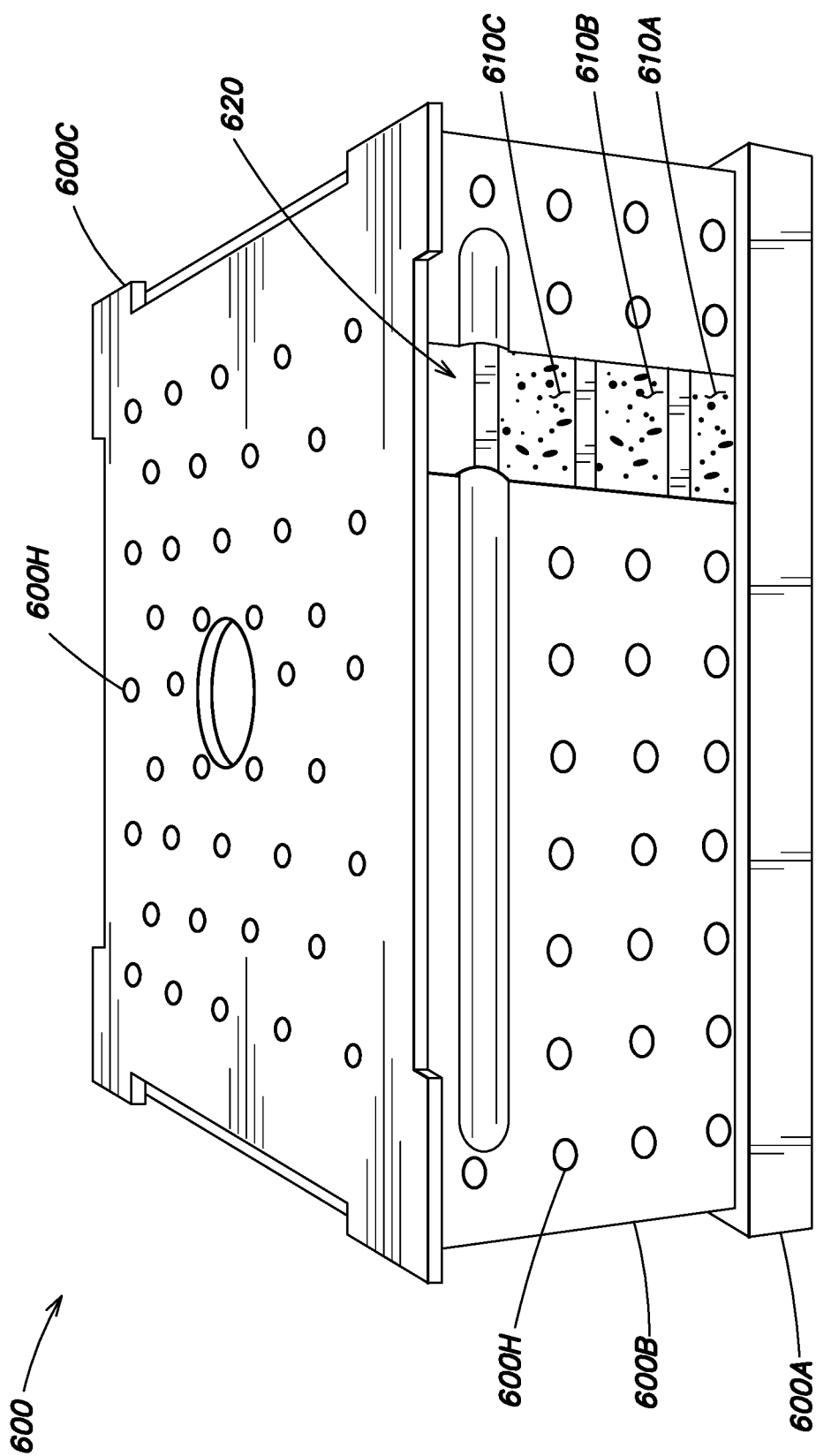
FIG. 7F is a view of the parts sintering support structure of FIG. 7D from an alternate perspective.

One example of an empty boat 600 is illustrated in FIG. 7A. The boat 600 with the lowermost tile 610A, parts 605, and first layer of standoffs 615 inserted is illustrated in FIG. 7B. The boat 600 with the middle tile 610B mounted on the lowermost tile 610A, second layer of parts 605, and second layer of standoffs 615 inserted is illustrated in FIG. 7C. The boat 600 with the upper tile 610C mounted on the middle tile 610B, and third layer of parts 605 inserted is illustrated in FIG. 7D. The boat 600 including the three tiles 610A, 610B, 610C and associated parts 605 with a lid 600C in place is illustrated in FIGS. 7E and 7F. As illustrated in FIGS. 7A-7D and 7F, one or more of the side walls 600B may include one or more slots 620 through which the tiles 610A, 610B, 610C may be accessed to assist with inserting and removing the tiles 610A, 610B, 610C.

Figure 8A:
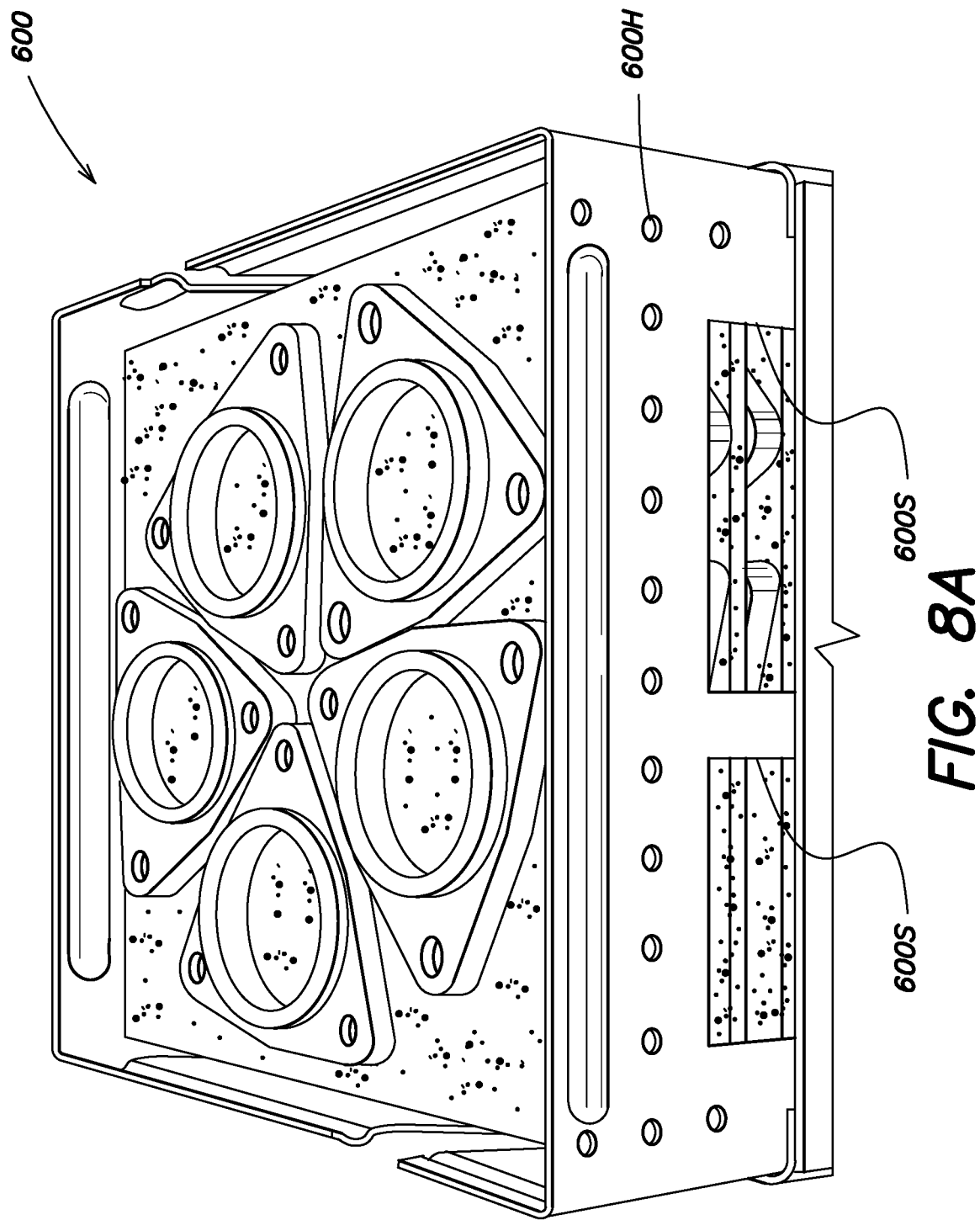
FIG. 8A illustrates another example of a parts sintering support structure without a cover plate.
Figure 8B:
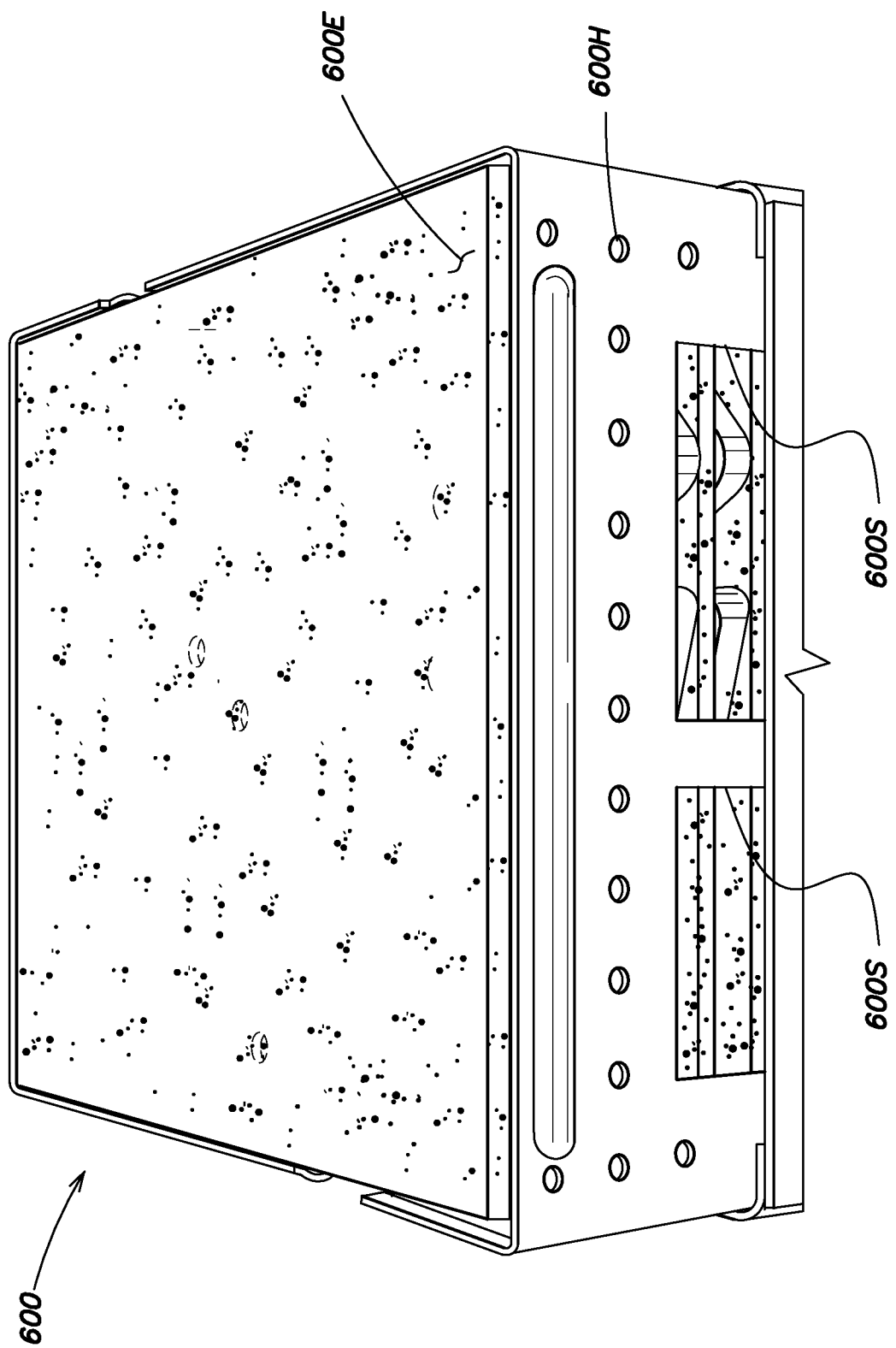
FIG. 8B illustrates the parts sintering support structure of FIG. 8A with a cover plate.
Figure 8C:
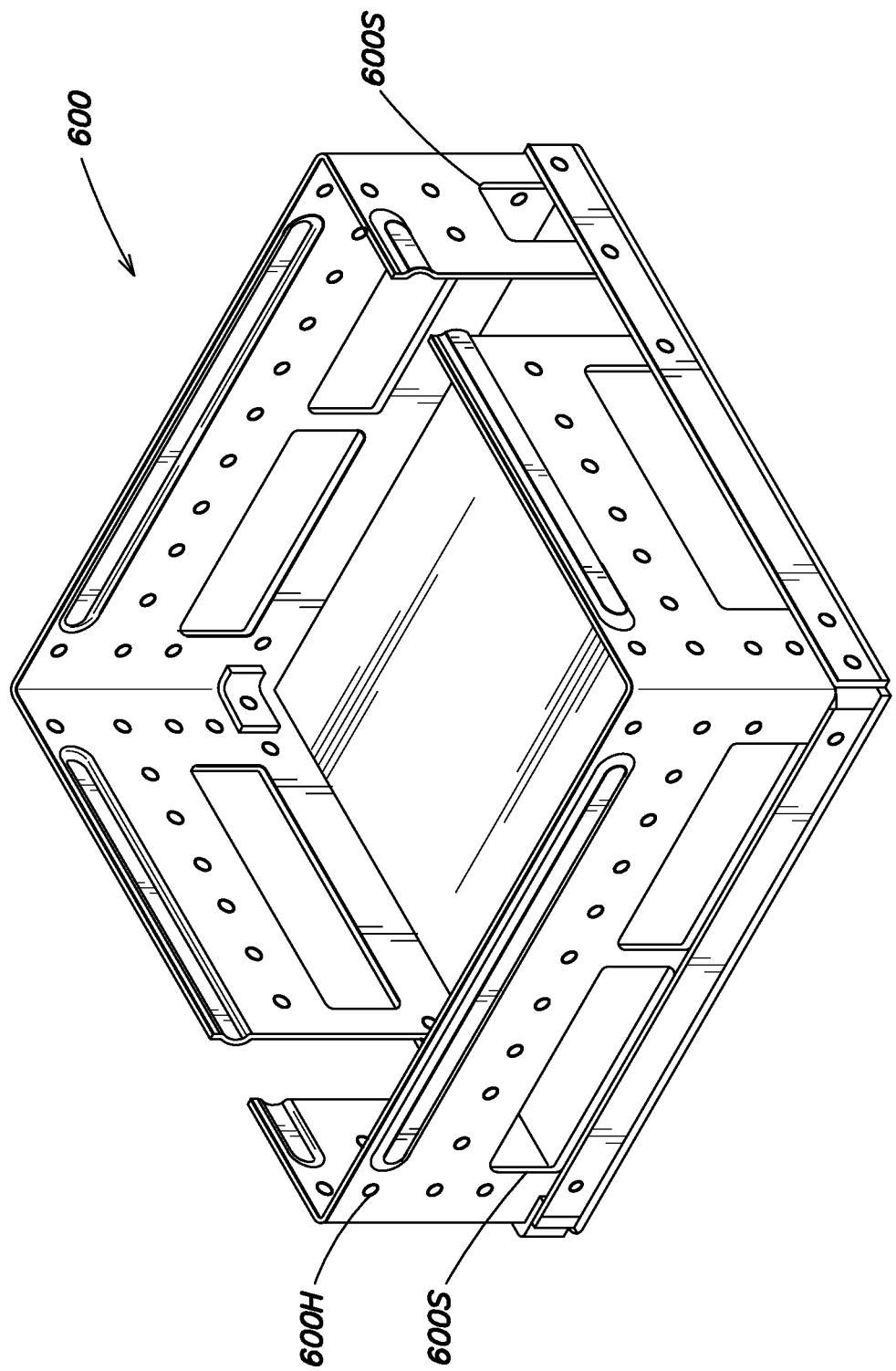
FIG. 8C is an isometric view of the parts sintering support structure of FIG. 8A without tiles, standoffs, parts, or a cover plate.

FIGS. 8A-8C illustrate an alternative boat design that includes slots 600S defined in a lower portion the walls of the boat 600. This boat design is illustrated without a cover plate 600E in FIG. 8A, with a cover plate 600E in FIG. 8B, and in isometric view in FIG. 8C. The slots 600S are rectangular and are longer in the horizontal direction, but alternate embodiments may have different heights and widths. Different slots 600S in a single wall may have the same or different dimensions, for example, as illustrated in FIG. 8C. The boat is illustrated with two slots per wall, but in alternative embodiments may have a single slot or more than two slots per wall or may include slots in only a sub-set of the walls. The slots 600S may provide for greater flow of heated air into the boat 600 than the openings or apertures 600H. The upper portions of the walls, including the openings or apertures 600H, may provide more resistance to airflow and may help to keep heated air within the boat 600.

Sintering furnaces operating with stacks of parts may be operated with a slower push rate without sacrificing productivity compared to furnaces operating with a single stack of parts. Using a slower push rate and increasing the time at the sintering temperature allows for a potentially lower sintering temperature which can lead to longer useful life of the furnace components and part support structures. Lower sintering temperature is particularly advantageous in taking full advantage of the benefit offered by the use of the MoLa boats—maintaining the material ductility at room temperature after the material has been subjected to high heat. The lower operating temperature may also increase the lifetime of the ceramic tiles 610A, 610B, 610C in a MoLa boat parts carrier, for example, as illustrated in FIGS. 6A and 6B by reducing the degree of thermal cycling and potential for thermally induced fracture.

Example 1

Calculations were performed to compare expected productivity for sintering stainless steel parts utilizing either full density ceramic supports, for example, as illustrated in FIG. 1 vs. sintering the stainless steel parts using a MoLa boat and 3 layer stack of foamed tiles, for example, as illustrated in FIGS. 6-7F (MoLa) in the tables below.

TABLE 1

Sinter Throughput

|  | Current State (Full Density Ceramic) | Future State (MoLa) |
| --- | --- | --- |
| Sinter Temperature | 2500° F. | 2350° F. |
| Sinter Ram Speed | 3:30 | 7:30 |
| Part Per Tile/Boat | 6 | 15 |
| Parts Sintered Per Hour | 103 | 150 |
| Percent Change In Throughput | — | 46% |

Table 1 above illustrates change in throughput when switching from the full density ceramic supports to the MoLa carrier. The rate of introduction of successive carriers into the furnace (Sinter Ram Speed) was decreased from 3.5 minutes to 7.5 minutes per carrier to provide increased sintering time to compensate for the lower operating temperature of the furnace with the MoLa carriers. Even with this increase in sintering time, the higher number of parts that could be sintered using the MoLa carriers than with the full density ceramic supports provided for throughput to be increased by 46% when switching from the full density ceramic supports to the MoLa carriers.

TABLE 2

Weight reduction

|  | Current State (Full Density Ceramic) | Future State (MoLa) |
| --- | --- | --- |
| Tiles/Boats Weight (lbs) | 15 | 21.5 |
| Tiles/Boats Weight Per Part Sintered (lbs) | 2.50 | 1.43 |
| Percent Change in Tile/Boat Weight Per Part | — | −43% |

As illustrated in Table 2 above, even though the MoLa carriers were heavier than the full density ceramic carriers, due to the larger number of parts that could be included in the MoLa & foamed ceramic carriers, the total weight per part decreased. Reducing the total heated weight per part results in energy savings/part sintered.

Example 2

A benefit sought from the embodiments of the MoLa boat and sintering tray design configuration as disclosed herein was to improve the productivity of the sintering operation. Specifically, the goal was to increase the throughput (number of parts/hr) that could be sintered in the given furnace. This has been demonstrated in production for two parts to date; the improvement potential is not limited to these two parts. To accomplish this, testing was performed to establish that parts sintered in multiple layers within the boat have the equivalent dimensional capability as the original process of sintering in a single layer on an open tile. Specifically, the dimensions of all parts from the new process should meet the specified part tolerances. In statistical terms, all critical dimensions should maintain a Cp>1.0.

Example 2A

Figure 9A:
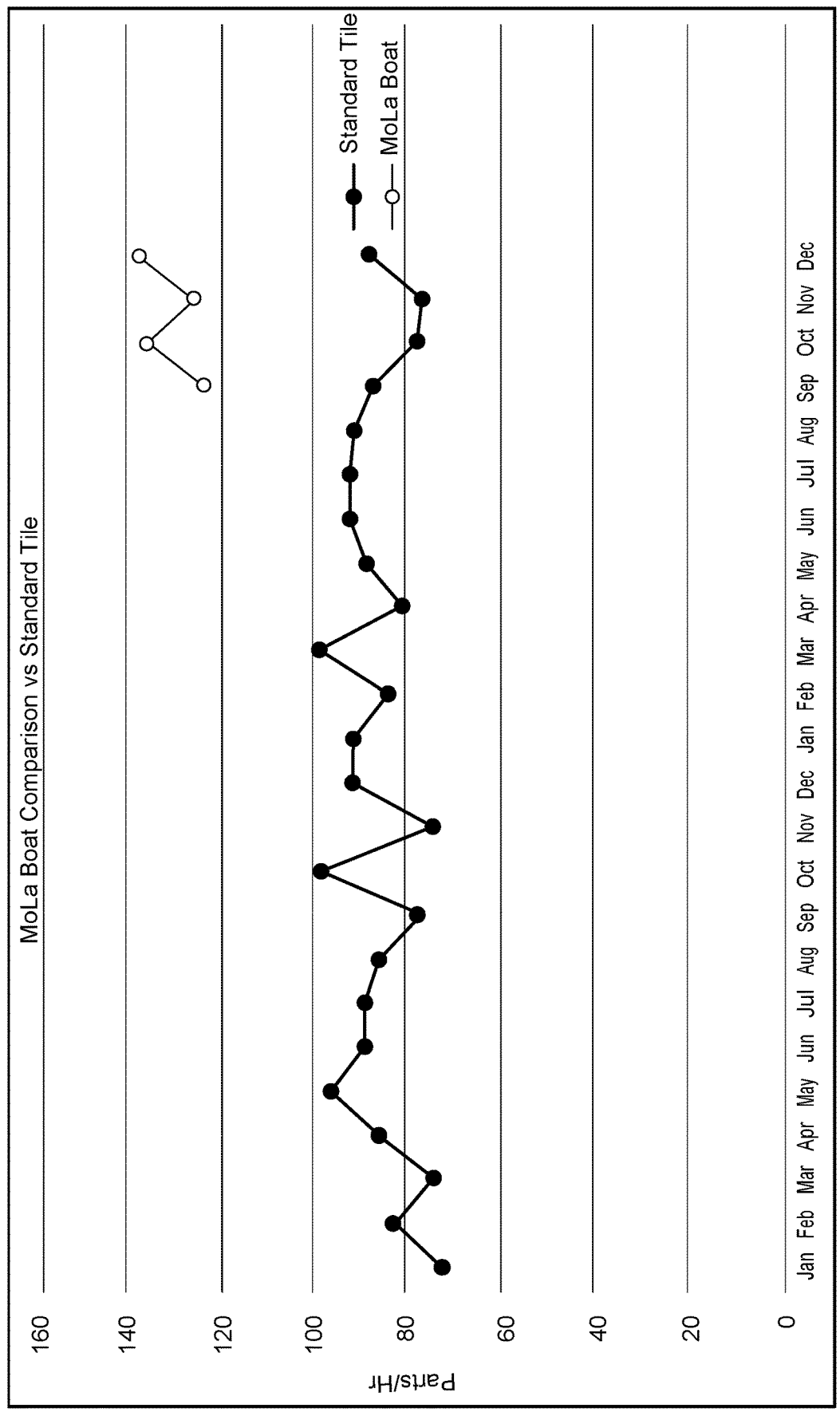
FIG. 9A illustrates results of throughput of one part through a sintering furnace utilizing an embodiment of a metal boat as disclosed herein as compared to the throughput using a flat tile.

Part number 1 was previously sintered on a 12"×12" ceramic tile, 6 parts/tile, in a high temperature pusher furnace with a push rate of 3.5 minutes to achieve a nominal calculated throughput of 103 parts/hr. Parts were in the hot zone for nominally 30 minutes with a temperature setpoint above 2500° F. Using the new MoLa boat and tray configuration, 20 parts/boat (5 parts×4 layers) are sintered using a push rate of 7.5 minutes to achieve a calculated production rate of 160 parts/hr, or a calculated increase in productivity of 55%. The ceramic tiles used in the MoLa boats had dimensions of 11"×11"×0.25" and thus accommodated 5 parts/tile as compared to the 6 parts/tile for the 12"×12" tiles. Actual data collected over a 4-month period, illustrated in the chart of FIG. 9A, showed an actual average improvement in productivity from 90 parts/hr to 135 parts/hr, or 50%.

Example 2B

Figure 9B:
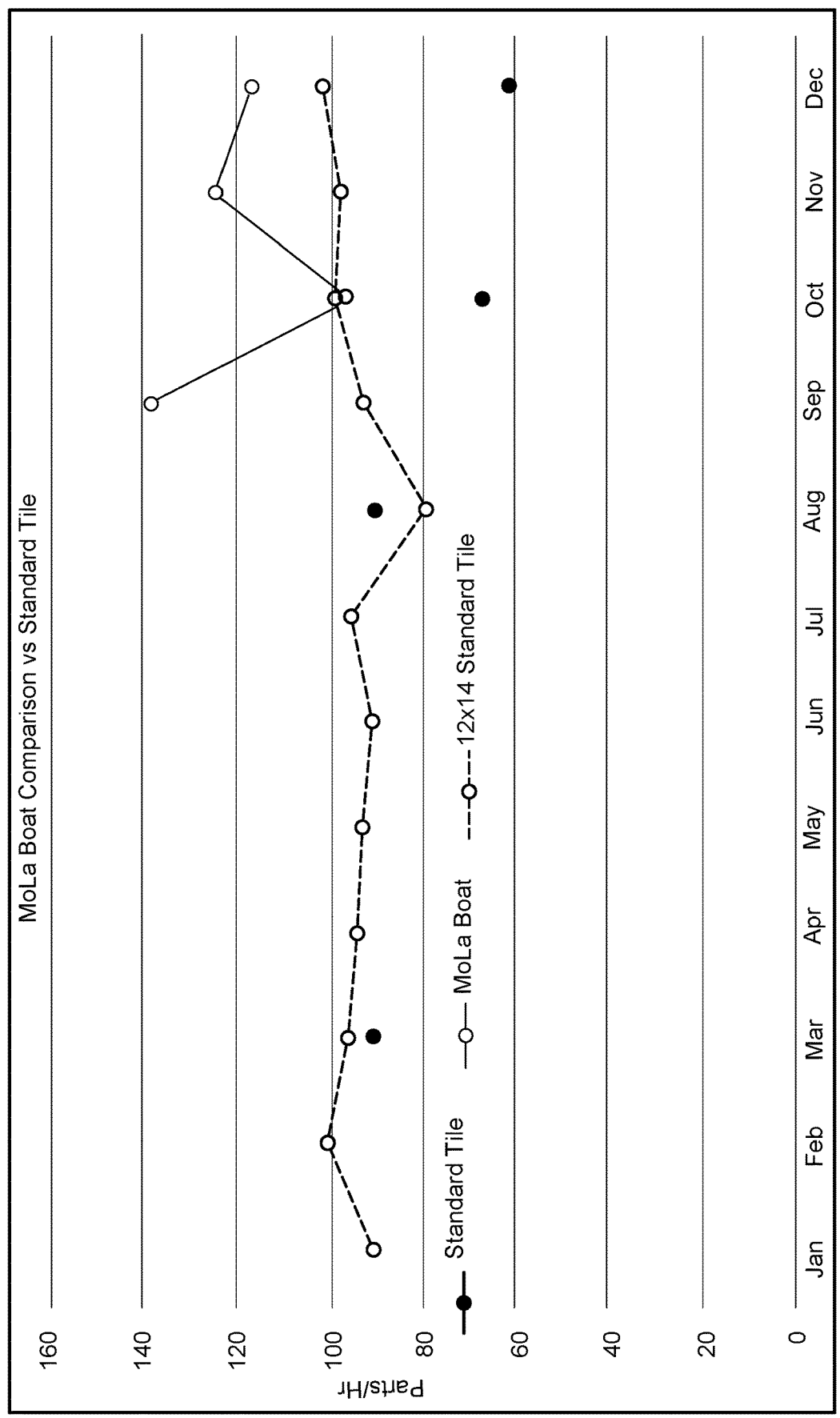
FIG. 9B illustrates results of throughput of another part through a sintering furnace utilizing an embodiment of a metal boat as disclosed herein as compared to the throughput using a flat tile.

Part number 2 was previously sintered on a 12"×12" ceramic tile, 6 parts/tile in a high temperature furnace with a push rate of 3.5 minutes to achieve nominally 30 minutes in the hot zone with the temperature setpoint above 2500° F. Throughput is again calculated to be 103 parts/hr. Using the disclosed MoLa boat and tray configuration, 15 parts/boat (5 parts×3 layers) are sintered using a push rate of 7.5 minutes to achieve a production rate of 120 parts/hr, for a calculated productivity gain of 17%. Actual data collected over a 4-month period, illustrated in the chart of FIG. 9B, showed an actual average improvement in productivity from nominally 100 parts/hr to 120 parts/hr, or 20%. Further testing is underway to increase the number of layers from 3 to 4, which would yield a calculated productivity gain of 55%.

Example 3

Another benefit that can be realized is that with the increased sintering time in the hot zone from 30 minutes to 60 minutes, with a slight temperature increase to 2450° F., improved dimensional capability can be realized by increasing the density of the parts. By more closely approaching terminal density, the statistical spread in dimensional tolerances is reduced. To take advantage of this benefit, tooling dimensions may be retargeted to accommodate for the additional shrinkage to recenter the narrower data distribution toward the center of the specification range.

Figure 10A:
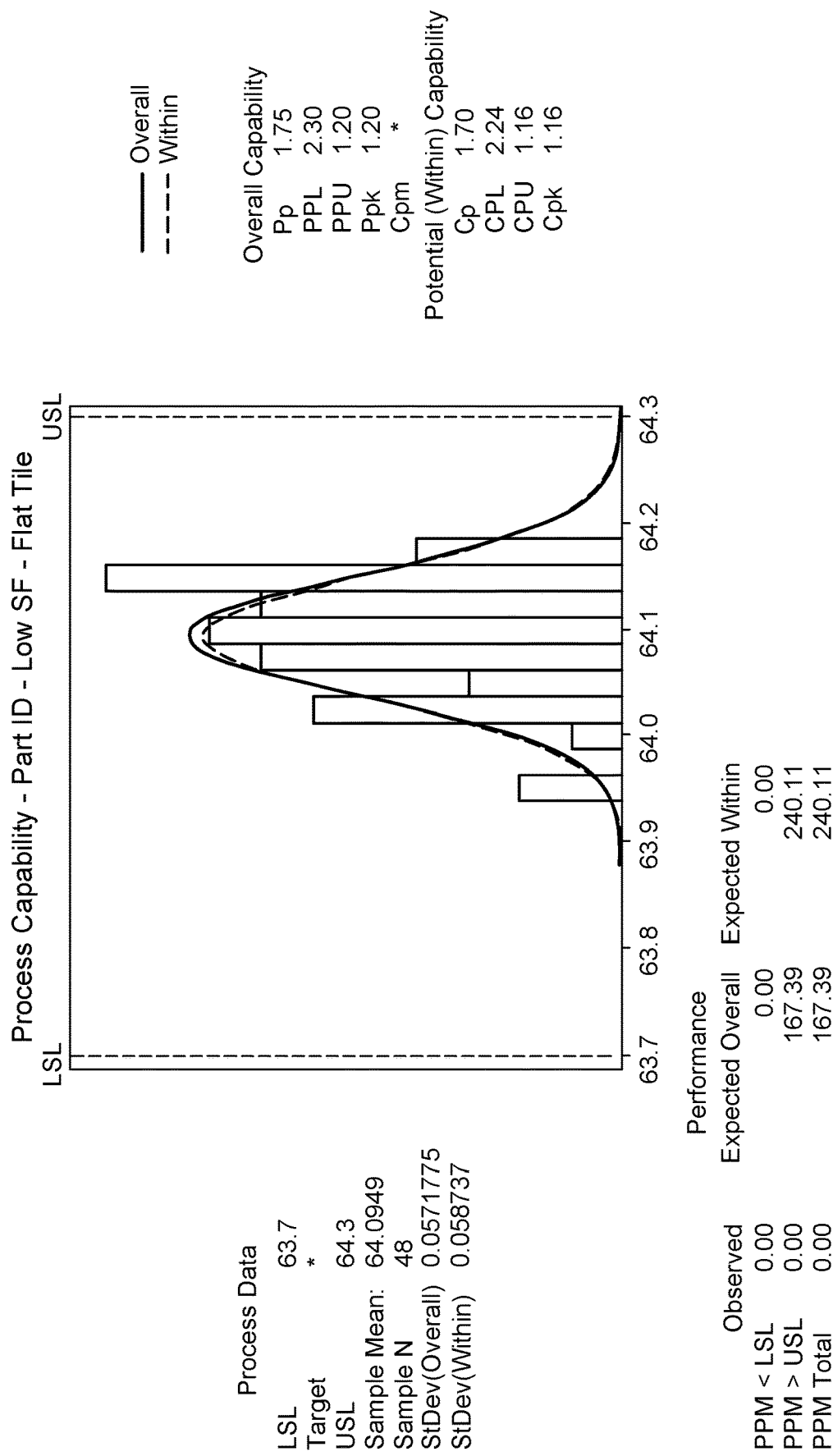
FIG. 10A illustrates measurements and statistical summaries of an observed characteristic dimension for one part after being sintered in a sintering furnace using a flat tile carrier.

Part number 1 shows a capable original single layer process with total process spread for an inner diameter of the part of Cp=1.70 relative to the total specification range. The process was also adequately centered within the specification with a Cpk=1.16. FIG. 10A includes a histogram of measurements of the inner diameter of part number 1 post-sintering over multiple runs with a flat tile carrier as compared to specification control limits and statistical summaries of the measurement data illustrating that the process is well within the specification control limits. In this figure the "Overall Capability" numbers reflect both variation within subgroups (e.g., a run of 8 MoLa boats) and between subgroups (e.g., multiple runs of 8 MoLa boats). The "Potential (Within) Capability" numbers reflect variation only within subgroups. The Pp and Cp numbers reflect a ratio of the difference between upper and lower specification limits to the 6-6 spread of the measured part inner diameters. The PPL and CPL numbers are ratios that compare the distance from the mean of the measured part inner diameters to the lower specification limit (LSL) to the one-sided spread of the process (the 3–σ variation) based on the overall standard deviation. The PPU and CPU numbers are ratios that compare the distance from the mean of the measured part inner diameters to the upper specification limit (USL) to the one-sided spread of the process (the 3–σ variation) based on the overall standard deviation. The Ppk and Cpk numbers are measures of overall process capability taking into account the value of the mean $\mu$ of the measured part inner diameters relative to the specification limits LSL and USL as well as the standard deviation $\sigma$ of the measured data and may be calculated according to the formula min[USL–$\mu$/3$\sigma$, $\mu$–LSL/3$\sigma$]. The PPM numbers on the bottom of the figure represent the number of parts in parts per million that would fall outside of the upper or lower specification limits based on the observed variability in the inner diameter measurements.

Figure 10B:
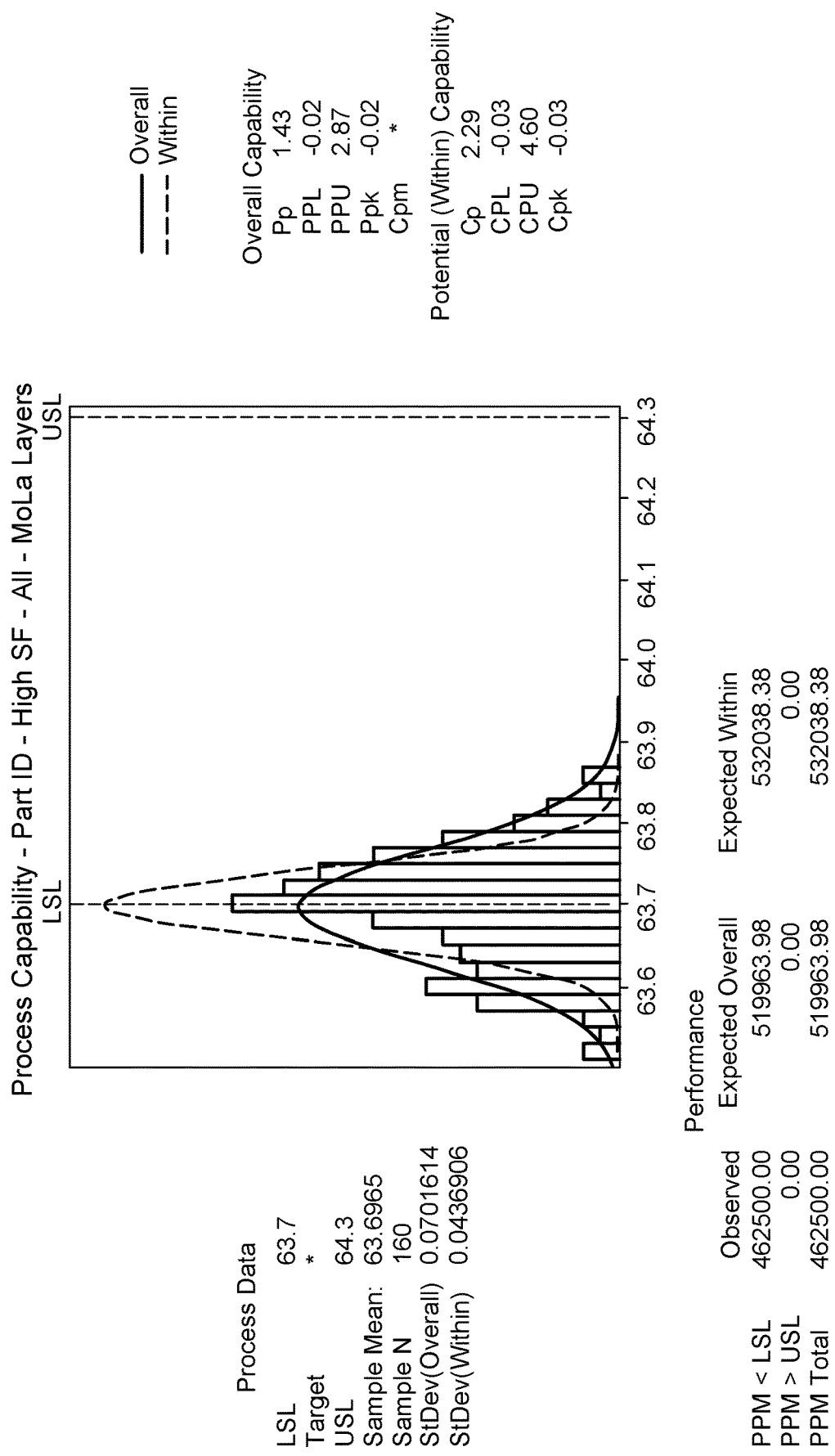
FIG. 10B illustrates measurements and statistical summaries of the same observed characteristic dimension as in FIG. 10A for the part after being sintered in a sintering furnace using a metal boat carrier as disclosed herein and a higher targeted shrink factor than in the process resulting in the data shown in FIG. 10A.

The new MoLa boat and stacking process provides an improved process capability (Cp=2.29) when a higher shrink factor (SF) is chosen. However, while the dimensional variation from part-to-part is reduced, the distribution moves toward the bottom range of the specification for the characteristic dimension, reducing the CpK to –0.03. By shifting the shrink factor in the tooling, nominal dimensions can be retargeted to the center of the tolerance band, thus taking advantage of the improved Cp to result in improved CpK. FIG. 10B includes a histogram showing measurements of the part inner diameters over multiple runs in an embodiment of a MoLa carrier as disclosed herein as compared to specification control limits and statistical summaries of the measurement data illustrating that the process is well under control but close to the lower specification control limit.

The phraseology and terminology used herein is for the purpose of description and should not be regarded as limiting. As used herein, the term "plurality" refers to two or more items or components. The terms "comprising," "including," "carrying," "having," "containing," and "involving," whether in the written description or the claims and the like, are open-ended terms, i.e., to mean "including but not limited to." Thus, the use of such terms is meant to encompass the items listed thereafter, and equivalents thereof, as well as additional items. Only the transitional phrases "consisting of" and "consisting essentially of," are closed or semi-closed transitional phrases, respectively, with respect to the claims. Use of ordinal terms such as "first," "second," "third," and the like in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Having thus described several aspects of at least one embodiment, it is to be appreciated various alterations, modifications, and improvements will readily occur to those skilled in the art. Any feature described in any embodiment may be included in or substituted for any feature of any other embodiment. Such alterations, modifications, and improvements are intended to be part of this disclosure, and are intended to be within the scope of the invention. Accordingly, the foregoing description and drawings are by way of example only.

What is claimed is:

1. An assembly for carrying parts to be sintered through a sintering furnace comprising:
   a boat formed of a refractory metal or metal alloy and including a base and sidewalls; and
   a plurality of vertically stacked ceramic tiles disposed within the boat, each of the plurality of vertically stacked ceramic tiles sized to carry a plurality of the parts to be sintered through the sintering furnace, a lowermost of the plurality of vertically stacked ceramic tiles having a greater mechanical strength than an uppermost of the plurality of vertically stacked ceramic tiles.

2. The assembly of claim 1, wherein the plurality of vertically stacked ceramic tiles are foamed ceramic tiles.

3. The assembly of claim 1, wherein the plurality of vertically stacked ceramic tiles are fiberboard ceramic tiles.

4. The assembly of claim 3, wherein the plurality of vertically stacked ceramic tiles have a density of less than 3.5 g/cm$^3$.

5. The assembly of claim 4, wherein the plurality of vertically stacked ceramic tiles have a density of less than 2.0 g/cm$^3$.

6. The assembly of claim 1, further comprising standoffs disposed between and maintaining vertical separation between adjacent ones of the plurality of vertically stacked ceramic tiles.

7. The assembly of claim 6, wherein the standoffs comprise ceramic.

8. The assembly of claim 1, further comprising a boat lid formed of one of a refractory metal or refractory metal alloy.

9. The assembly of claim 8, wherein the boat lid includes a plurality of apertures.

10. The assembly of claim 1, further comprising a top cap formed of one of a refractory metal, a metal alloy, or of a ceramic material.

11. The assembly of claim 10, wherein the top cap is configured to be supported by standoffs disposed on an uppermost ceramic tile disposed within the boat.

12. The assembly of claim 1, wherein the refractory metal is molybdenum.

13. The assembly of claim 12, wherein the refractory metal is lanthanated molybdenum (MoLa).

14. The assembly of claim 1, wherein the sidewalls include a plurality of apertures.

15. The assembly of claim 14, wherein the plurality of apertures are uniformly spaced on the sidewalls.

16. The assembly of claim 14, wherein the plurality of apertures are distributed non-uniformly on the sidewalls to adjust the radiant energy and gas flow to the parts.

17. The assembly of claim 14, further comprising one or more slots defined in lower portions of the sidewalls.

18. The assembly of claim 1, wherein the plurality of vertically stacked ceramic tiles each include a plurality of recesses configured to retain the plurality of parts to be sintered.

19. The assembly of claim 1, wherein the sidewalls include slots through which the plurality of vertically stacked ceramic tiles may be accessed for loading and removal from the boat.

20. The assembly of claim 1, wherein the lowermost of the plurality of vertically stacked ceramic tiles has one of a greater thickness or a greater density than the uppermost of the plurality of vertically stacked ceramic tiles.

21. The assembly of claim 1, wherein a lowermost of the plurality of vertically stacked ceramic tiles has a same thickness as an uppermost of the plurality of vertically stacked ceramic tiles.

22. The assembly of claim 1, wherein the plurality of vertically stacked ceramic tiles includes at least three vertically stacked ceramic tiles.

23. The assembly of claim 1, wherein each of the plurality of vertically stacked ceramic tiles carry a same number of the plurality of the parts to be sintered.

24. The assembly of claim 1, wherein one of the plurality of vertically stacked ceramic tiles carries a different number of the plurality of the parts to be sintered than another of the plurality of vertically stacked ceramic tiles.

25. The assembly of claim 1, wherein the number of the plurality of parts to be sintered are oriented in a same position on each of the plurality of vertically stacked ceramic tiles.

26. The assembly of claim 1, wherein the number of the plurality of parts to be sintered are oriented in a different position on one of the plurality of vertically stacked ceramic tiles than on another of the plurality of vertically stacked ceramic tiles.

27. A method of sintering parts, the method comprising:
   mounting a plurality of the parts within a carrier including:
      a boat formed of a refractory metal or metal alloy and including a base and sidewalls, the sidewalls include a plurality of apertures distributed non-uniformly on the sidewalls to adjust the radiant energy and gas flow to the parts; and
      a plurality of vertically stacked ceramic tiles disposed within the boat, each of the plurality of vertically stacked ceramic tiles sized to carry a plurality of parts to be sintered through the sintering furnace; and
   passing the carrier through a sintering furnace heated to a temperature sufficient to sinter the parts.

28. The method of claim 27, further comprising forming the plurality of parts to be sintered by compactifying one or more powdered materials.

29. The method of claim 27, further comprising forming the plurality of parts to be sintered by metal injection molding.

30. The method of claim 27, further comprising forming the plurality of parts to be sintered by additive manufacturing.

31. A method of retrofitting a sintering system, the method comprising:
   replacing carriers used to transport parts to be sintered through the sintering furnace with carriers including:

a boat formed of a refractory metal or metal alloy and including a base and sidewalls;
a plurality of vertically stacked ceramic tiles disposed within the boat, each of the plurality of vertically stacked ceramic tiles sized to carry a plurality of parts to be sintered through the sintering furnace; and
a top cap formed of one of a refractory metal or a metal alloy, the top cap configured to be supported by standoffs disposed on an uppermost ceramic tile disposed within the boat.

* * * * *